(12) United States Patent
Nakasuji et al.

(10) Patent No.: US 7,456,865 B2
(45) Date of Patent: Nov. 25, 2008

(54) IMAGING APPARATUS AND IMAGING METHOD

(75) Inventors: Motohiro Nakasuji, Kanagawa (JP); Takashi Kameyama, Kanagawa (JP); Katsumi Kaneko, Kanagawa (JP); Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 10/472,613

(22) PCT Filed: Jan. 22, 2003

(86) PCT No.: PCT/JP03/00551

§ 371 (c)(1), (2), (4) Date: Sep. 19, 2003

(87) PCT Pub. No.: WO03/063472

PCT Pub. Date: Jul. 31, 2003

(65) Prior Publication Data

US 2005/0012827 A1    Jan. 20, 2005

(30) Foreign Application Priority Data

Jan. 22, 2002 (JP) ............................ 2002-013147

(51) Int. Cl.
H04N 5/232 (2006.01)
(52) U.S. Cl. .................................................. 348/222.1
(58) Field of Classification Search ............. 348/222.1, 348/441, 169
See application file for complete search history.

(56) References Cited

U.S. PATENT DOCUMENTS

| | | | | |
|---|---|---|---|---|
| 4,652,907 A | * | 3/1987 | Fling | 348/621 |
| 6,424,789 B1 | * | 7/2002 | Abdel-Mottaleb | 386/52 |
| 6,891,570 B2 | * | 5/2005 | Tantalo et al. | 348/362 |
| 7,129,977 B2 | * | 10/2006 | Lee et al. | 348/302 |
| 2002/0021364 A1 | * | 2/2002 | Asada et al. | 348/312 |

FOREIGN PATENT DOCUMENTS

| | | |
|---|---|---|
| EP | 1 168 833 | 1/2002 |
| JP | 6 169419 | 6/1994 |
| JP | 7 193787 | 7/1995 |
| JP | 7 298112 | 11/1995 |
| JP | 8-46871 | 2/1996 |

(Continued)

Primary Examiner—Tuan V Ho
(74) Attorney, Agent, or Firm—Frommer Lawrence & Haug LLP; William S. Frommer; Thomas F. Presson

(57) ABSTRACT

An image shooting unit 21 generates an image signal Spa having an image shooting frame rate. A frame addition unit 41 performs frame addition on the image signal DVb having the image shooting frame rate. Control unit 61 controls drive unit 71 and the frame addition unit 41 based on a frame rate setting signal RSF from operation unit 62, and controls a variation of the image shooting frame rate in image shooting unit 21 and/or a switch of the number of additive frames in the frame addition unit 41, thus allowing an image signal DVj having a desired frame rate to be output from the frame addition unit 41. Thus, increasing the additive frame in number even without decreasing the image shooting frame rate at a low-speed shooting of the image allows such an image signal DVj shot at the low speed to be obtained.

19 Claims, 27 Drawing Sheets

FOREIGN PATENT DOCUMENTS

| | | |
|---|---|---|
| JP | 11 32241 | 2/1999 |
| JP | 2001-358984 | 12/2001 |
| JP | 2002-10129 | 1/2002 |
| JP | 2002-10221 | 1/2002 |
| WO | WO 01 87377 | 11/2001 |

* cited by examiner

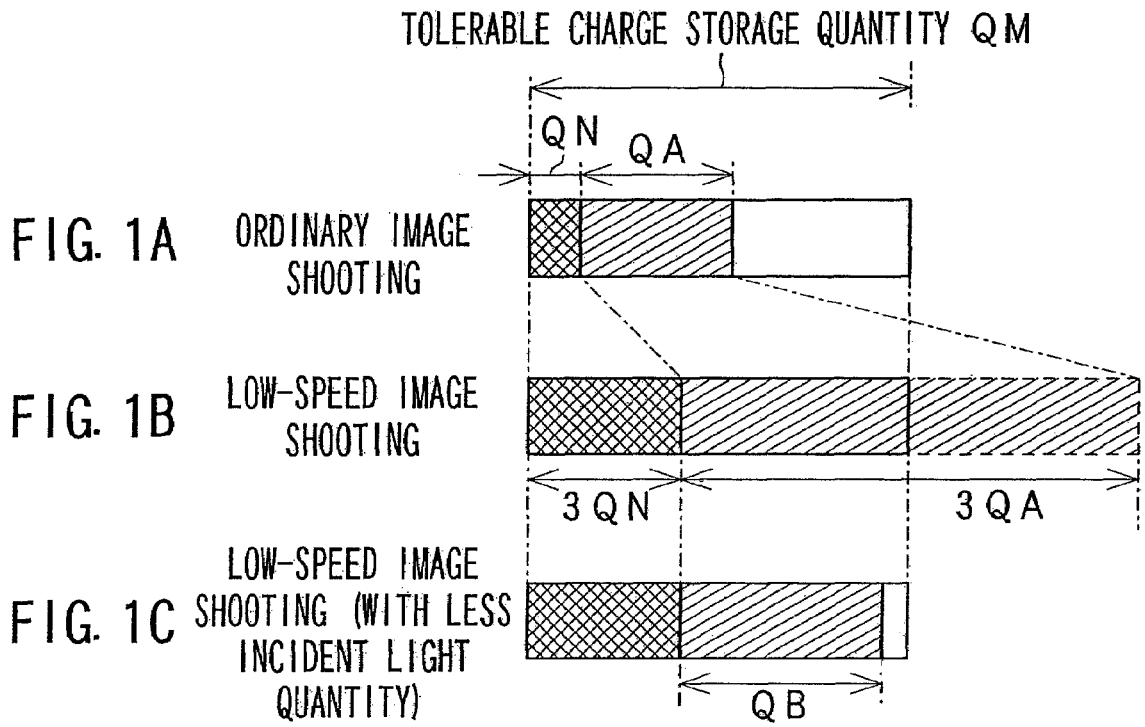
RELATED ART
FIG. 5
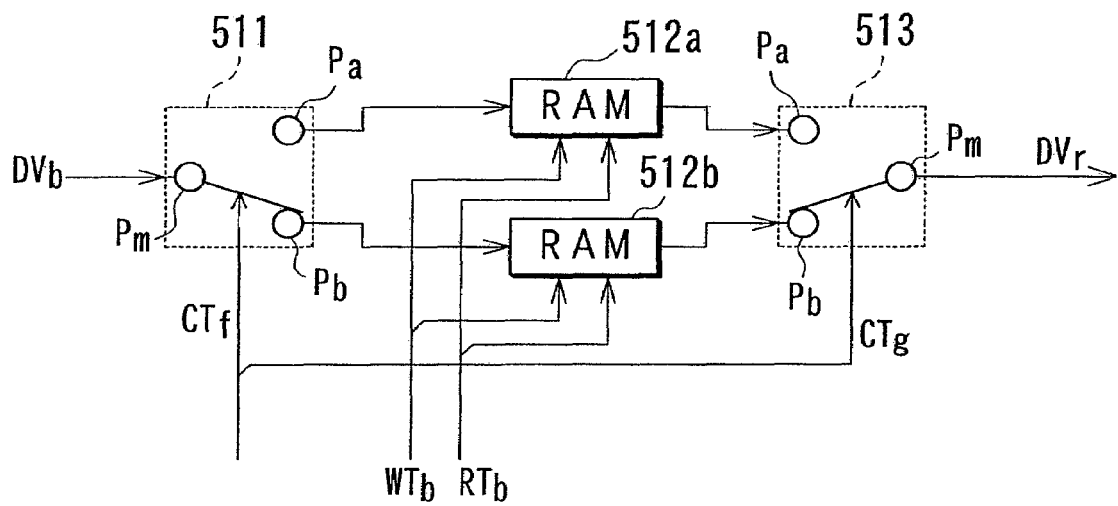

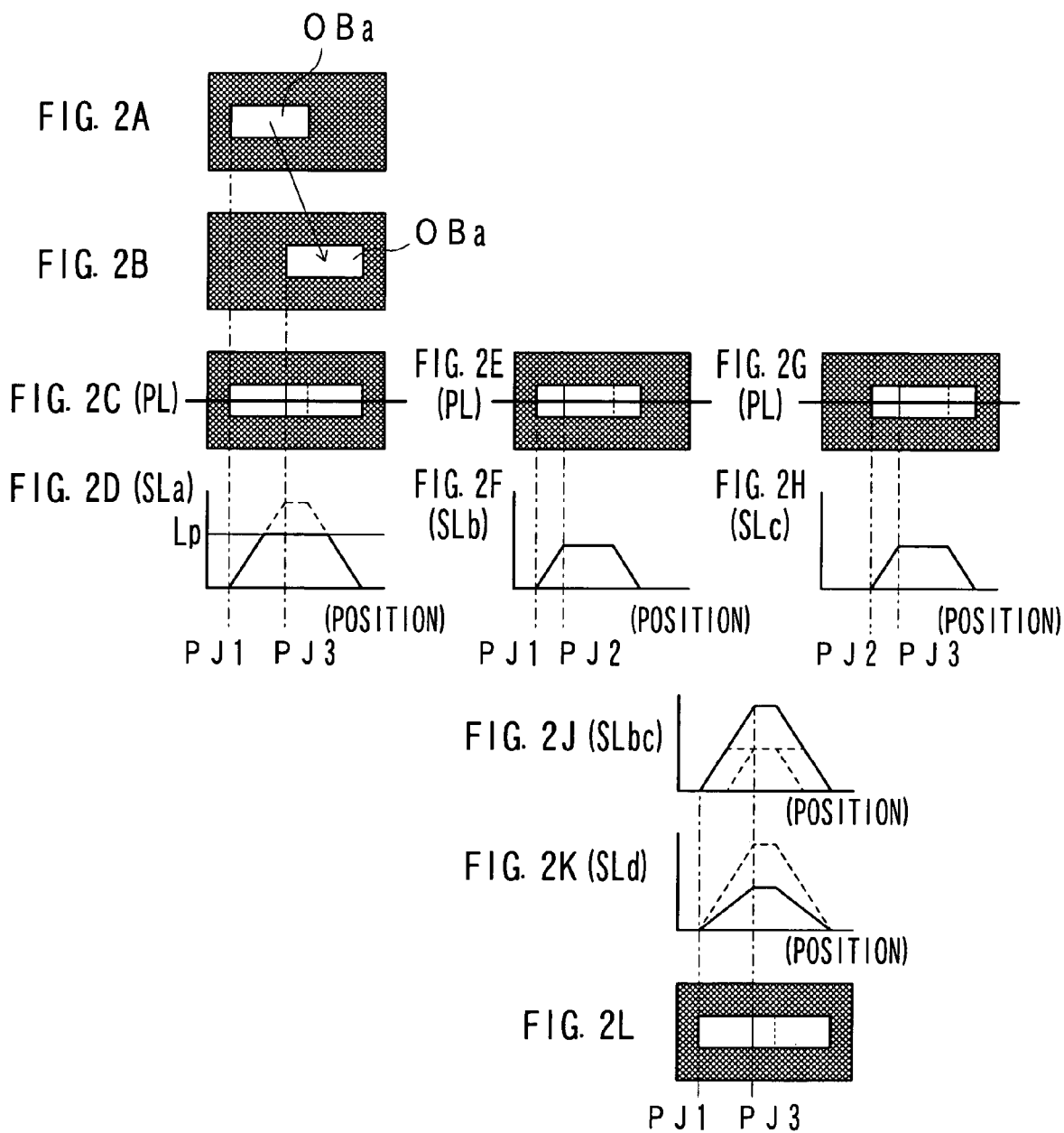

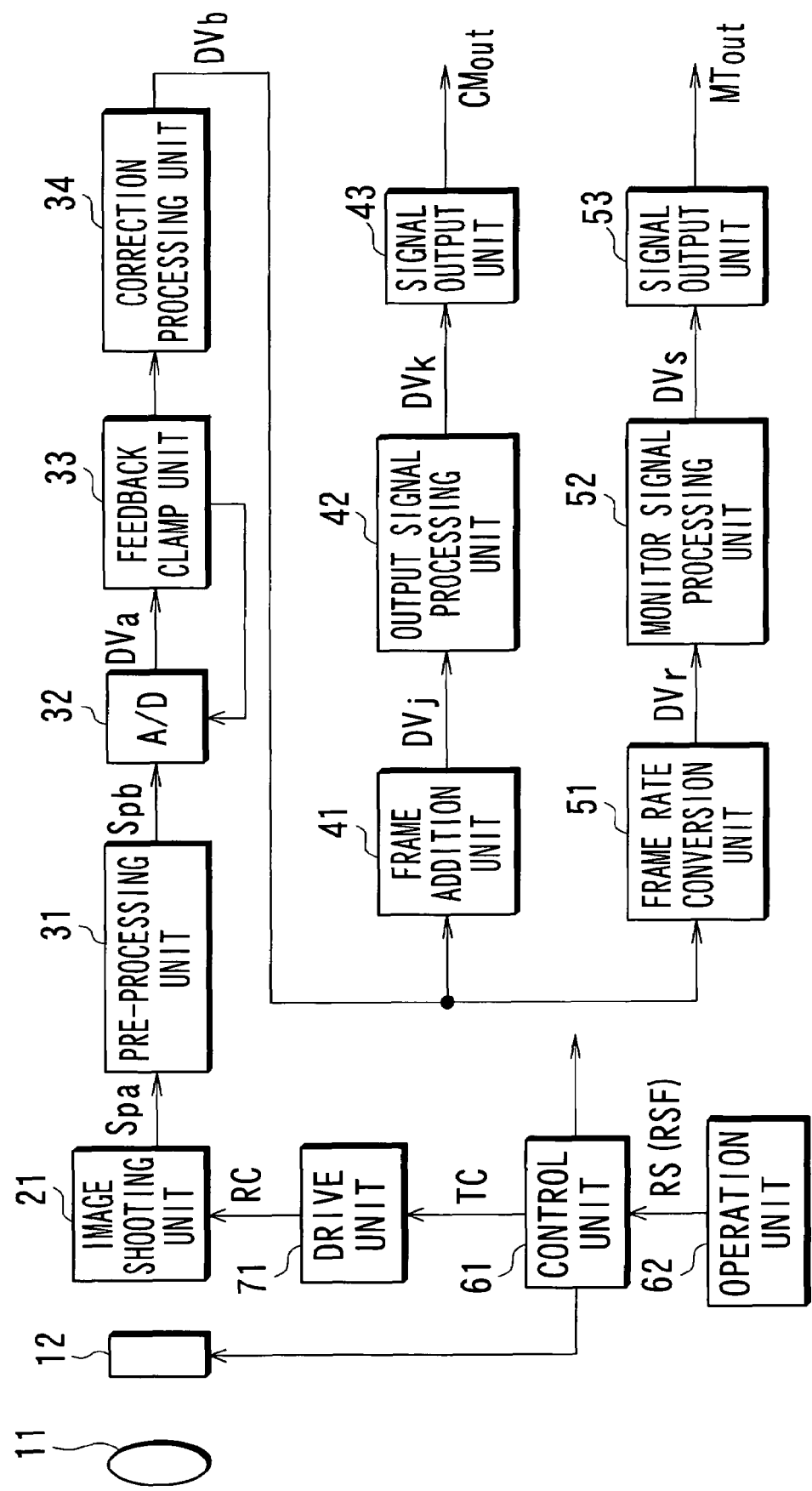

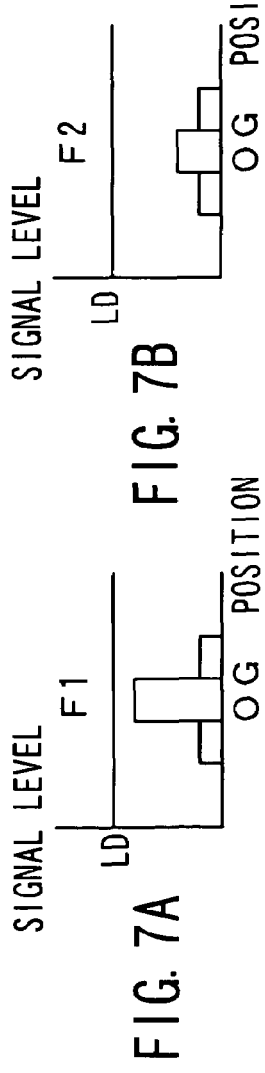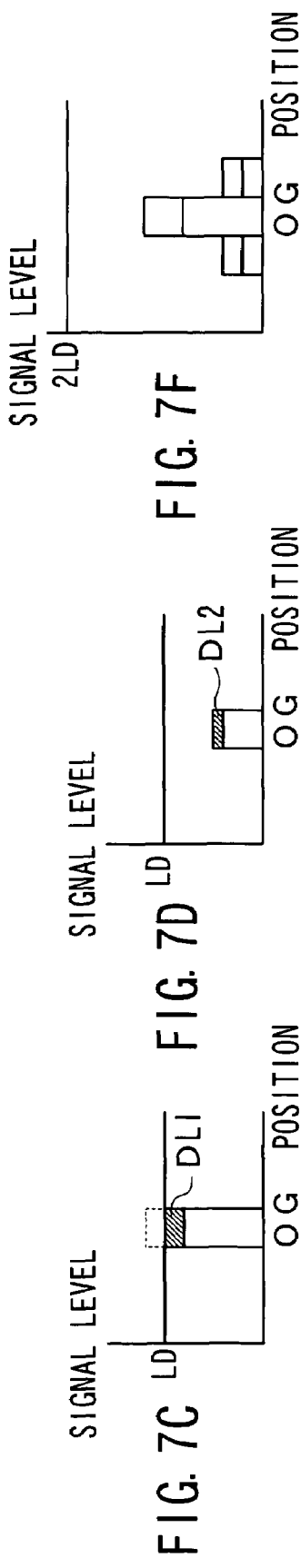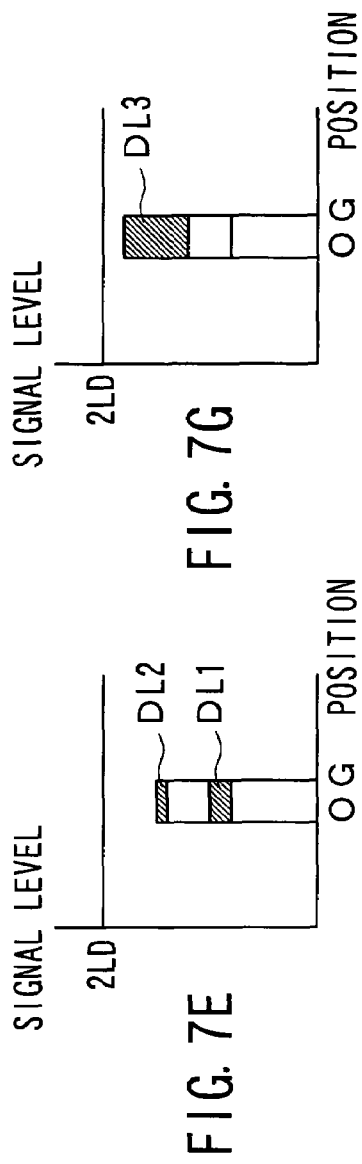

FIG. 9

| ADDITION SWITCHING INFORMATION || IMAGE SHOOTING FRAME RATE $FRp = FRc \times FA$ |
|---|---|---|
| OUTPUT FRAME RATE $FRc$ | NUMBER OF ADDITIVE FRAMES $FA$ | |
| $60P \geq FRc > 30P$ | 1 | $60P \geq FRp > 30P$ |
| $30P \geq FRc > 20P$ | 2 | $60P \geq FRp > 40P$ |
| $20P \geq FRc > 15P$ | 3 | $60P \geq FRp > 45P$ |
| $15P \geq FRc > 12P$ | 4 | $60P \geq FRp > 48P$ |
| $12P \geq FRc > 10P$ | 5 | $60P \geq FRp > 50P$ |
| $10P \geq FRc > 6P$ | 6 | $60P \geq FRp > 36P$ |
| $6P \geq FRc > 5P$ | 10 | $60P \geq FRp > 50P$ |
| $5P \geq FRc > 4P$ | 12 | $60P \geq FRp > 48P$ |
| $4P \geq FRc > 3P$ | 15 | $60P \geq FRp > 45P$ |
| $3P \geq FRc > 2P$ | 20 | $60P \geq FRp > 40P$ |
| $2P \geq FRc > 1P$ | 30 | $60P \geq FRp > 30P$ |
| $1P$ | 60 | $60P$ |

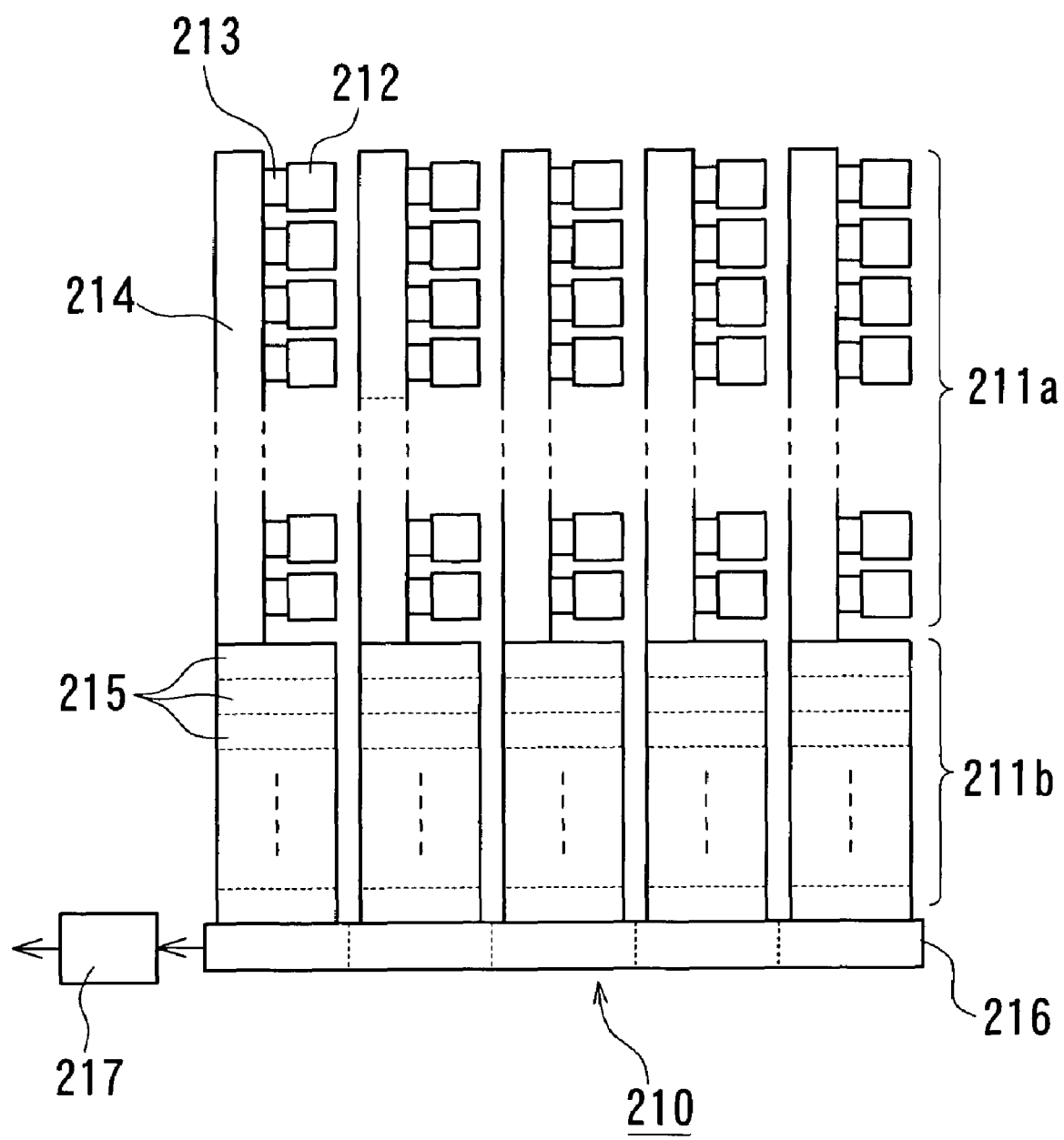

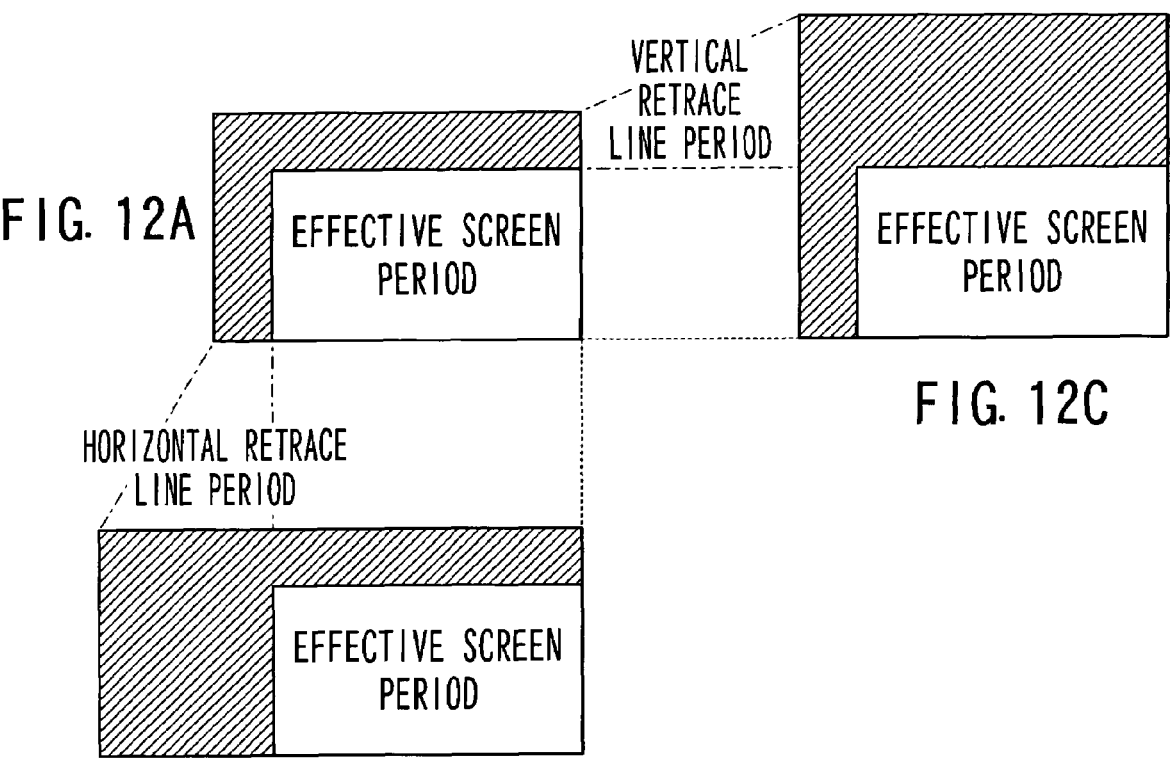

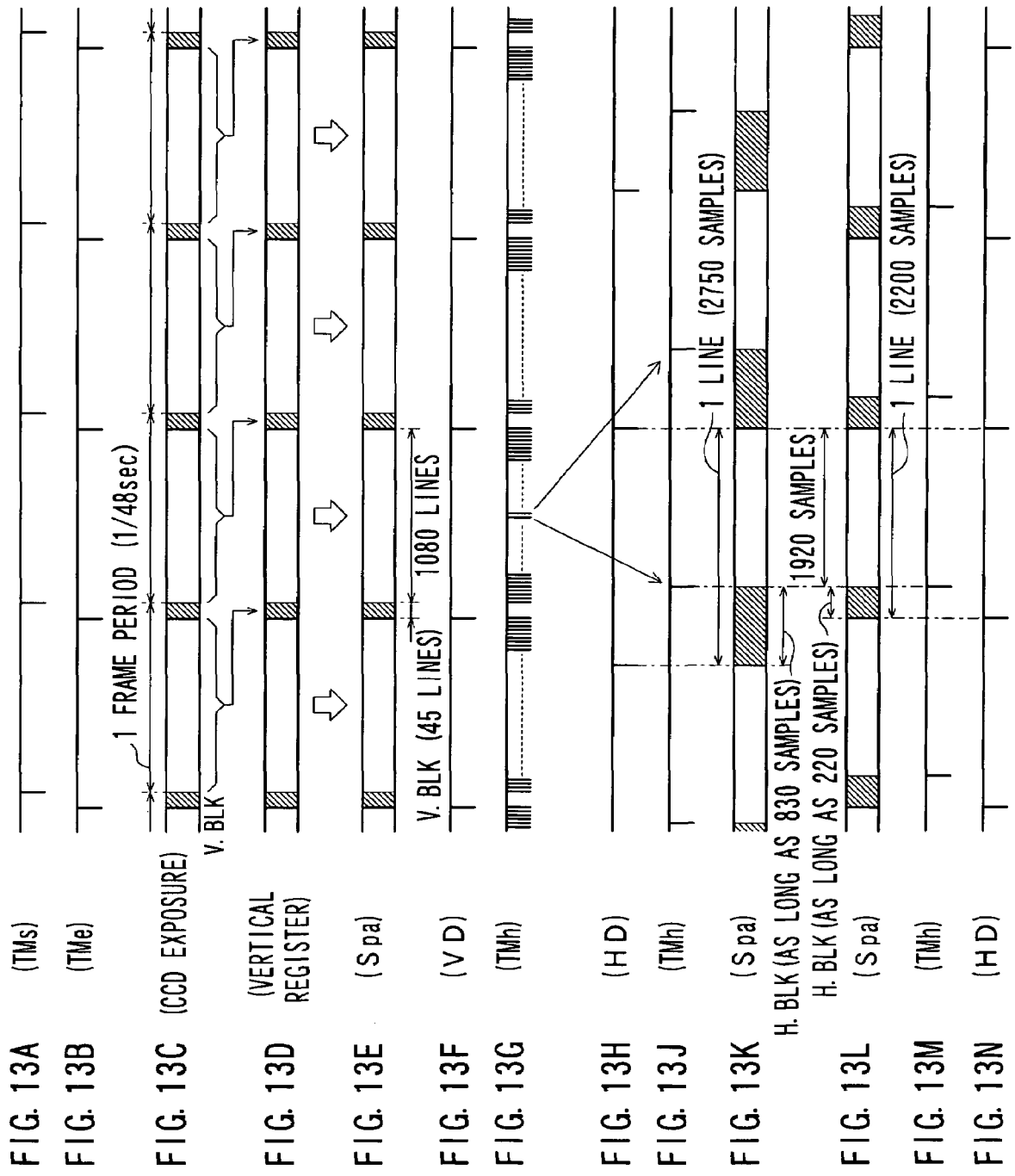

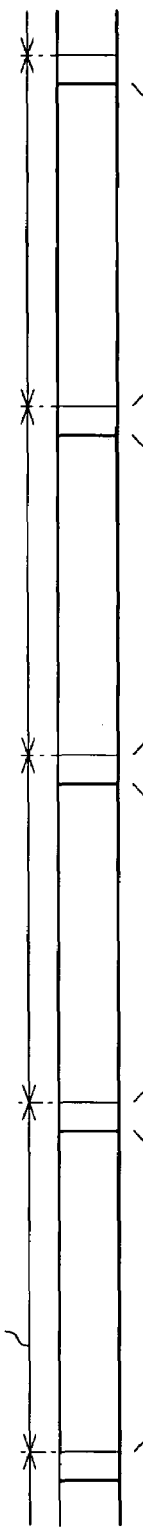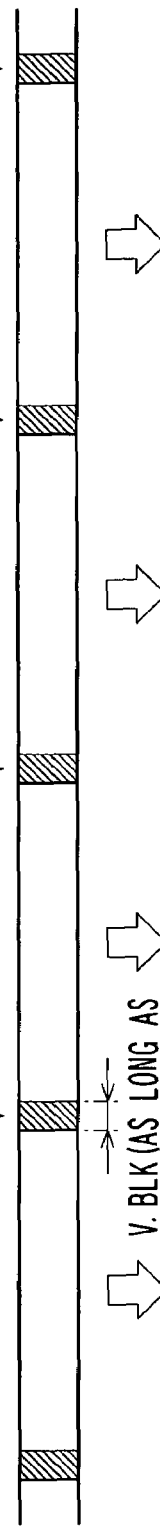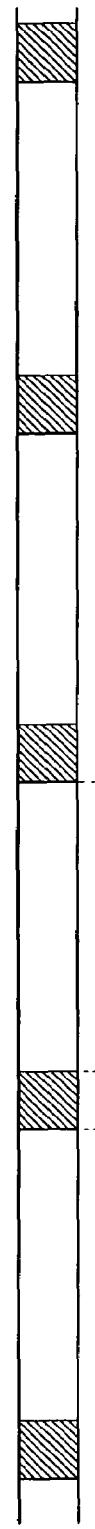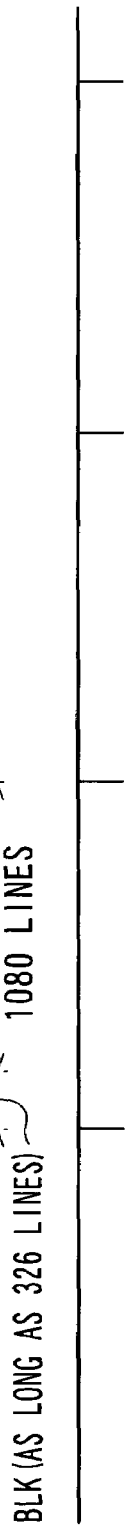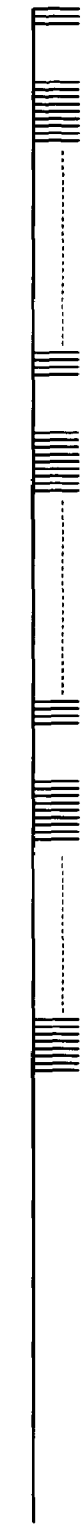
FIG. 14A (TMs)
FIG. 14B (TMe)
FIG. 14C (CCD EXPOSURE)
FIG. 14D (VERTICAL REGISTER)
FIG. 14E (Spa)
FIG. 14F (VD)
FIG. 14G (TMh)
1 FRAME PERIOD (1/48sec)
V. BLK (AS LONG AS 45 LINES)
1080 LINES
V. BLK (AS LONG AS 326 LINES)

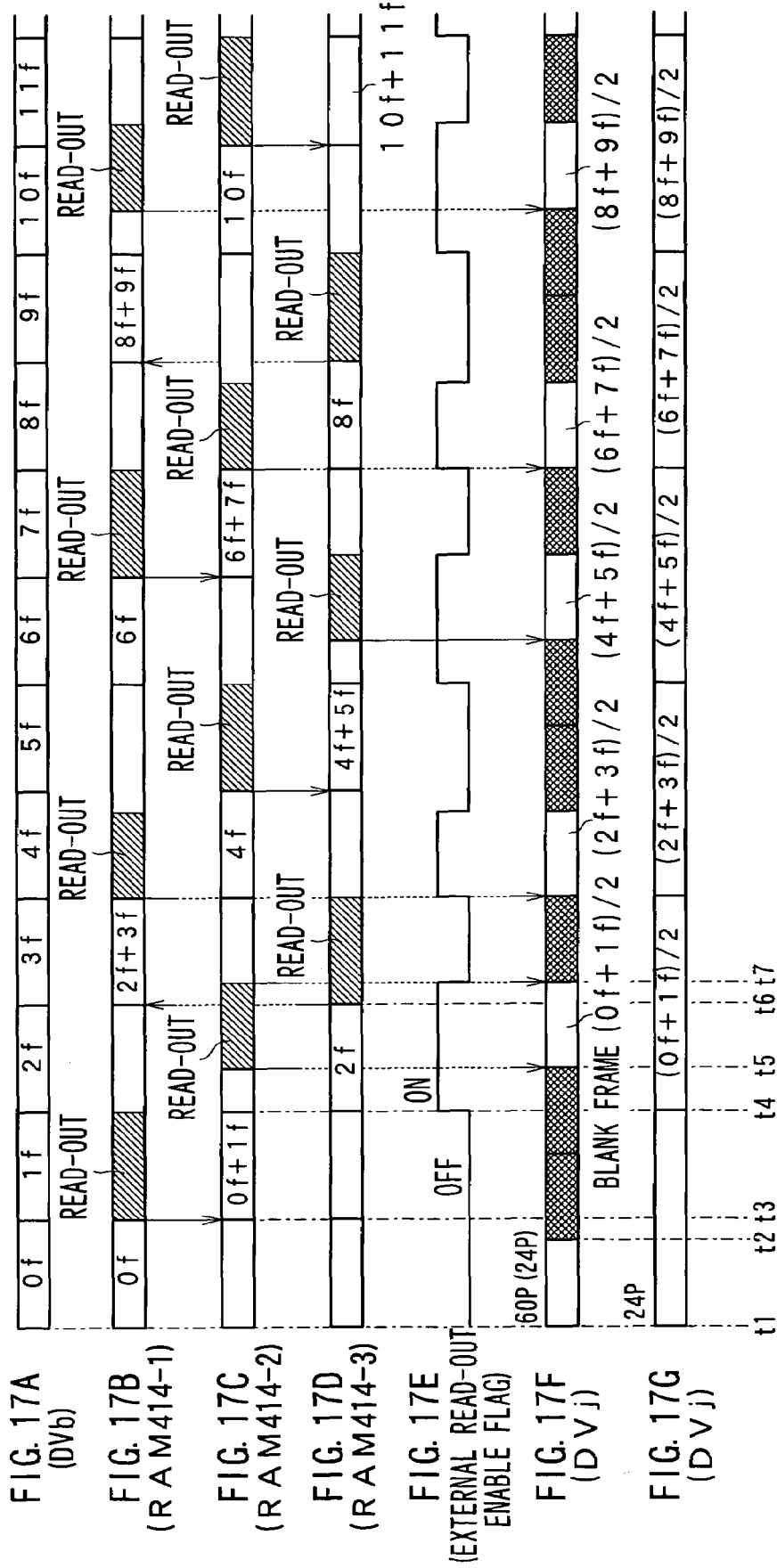

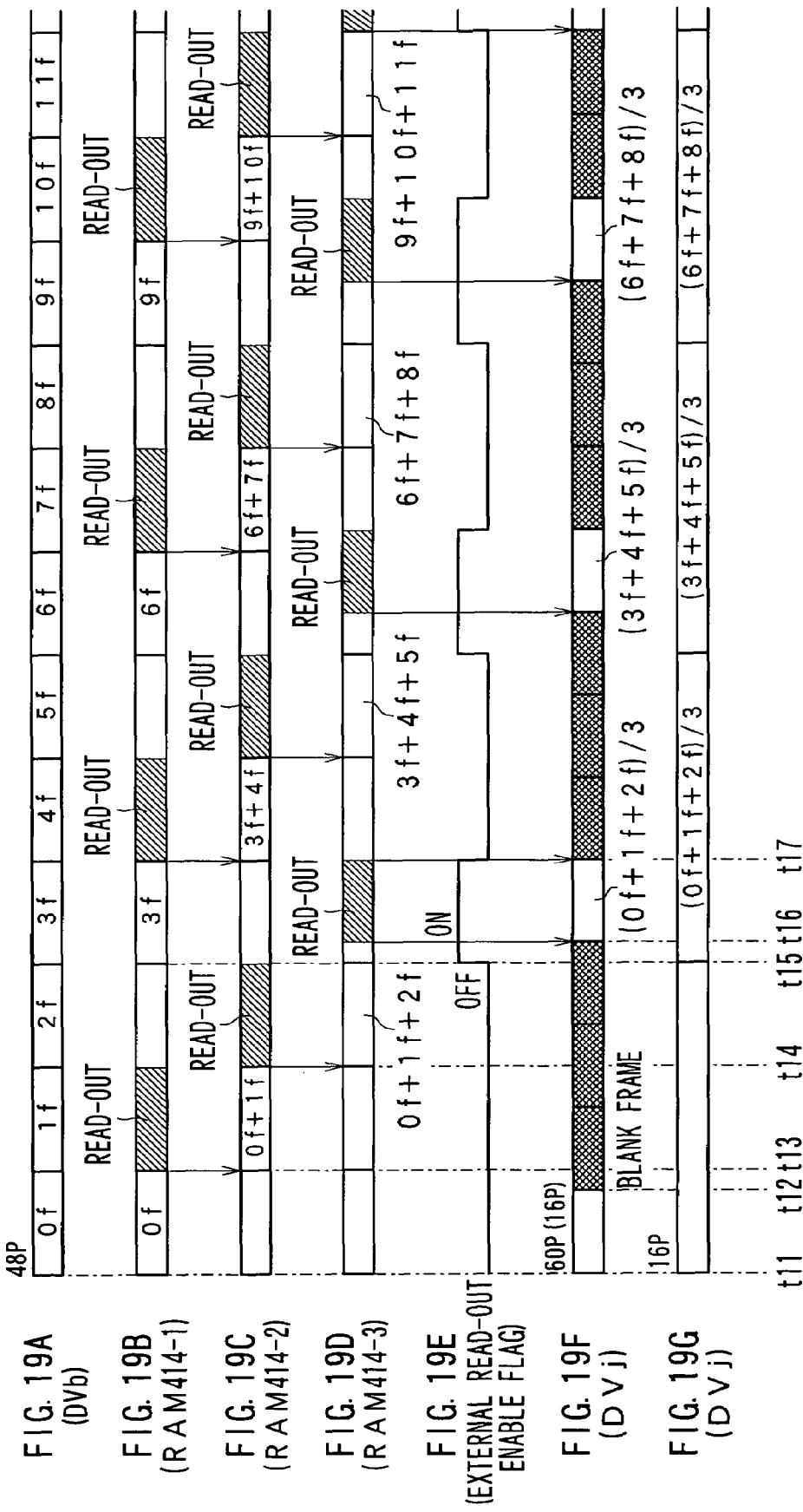

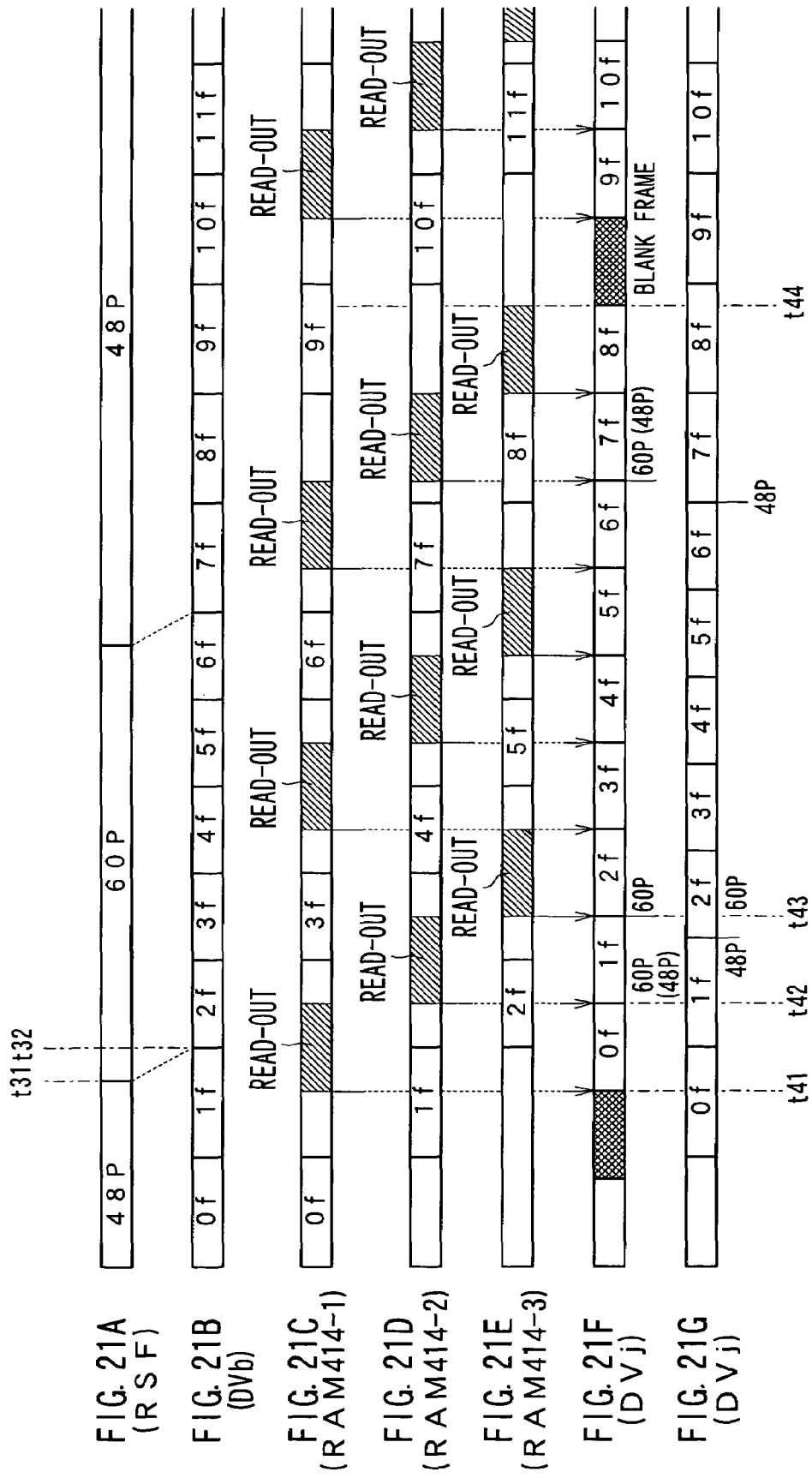

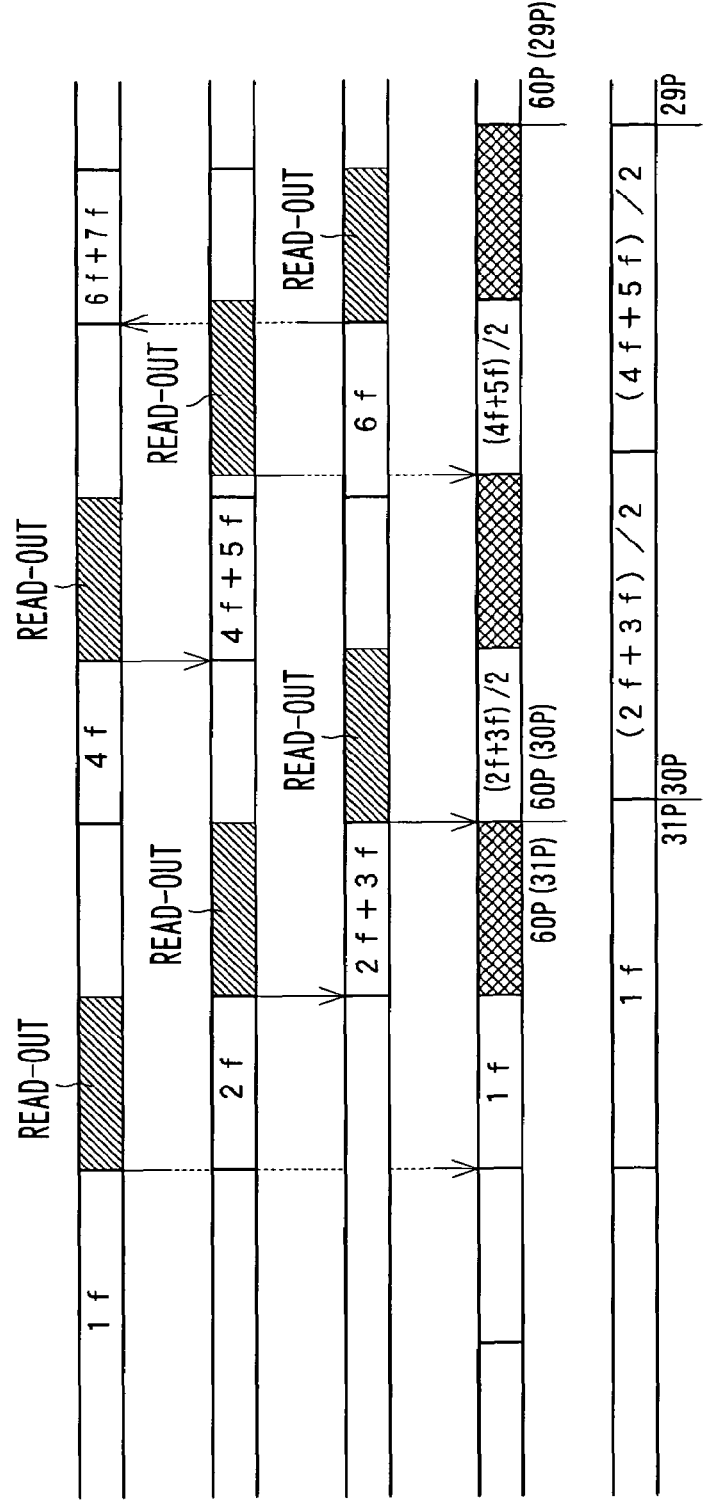

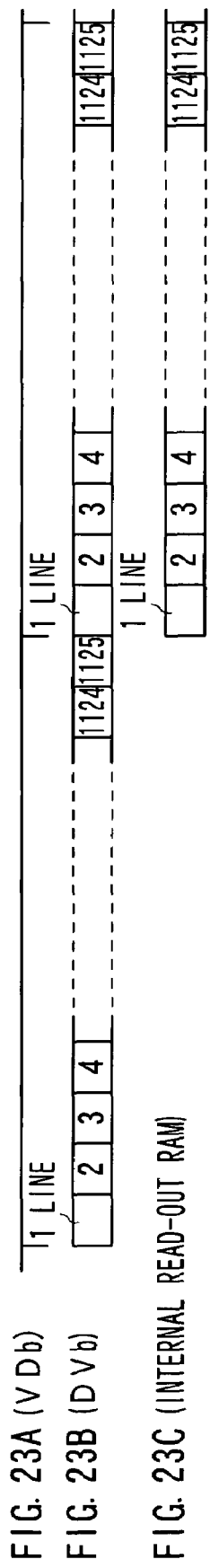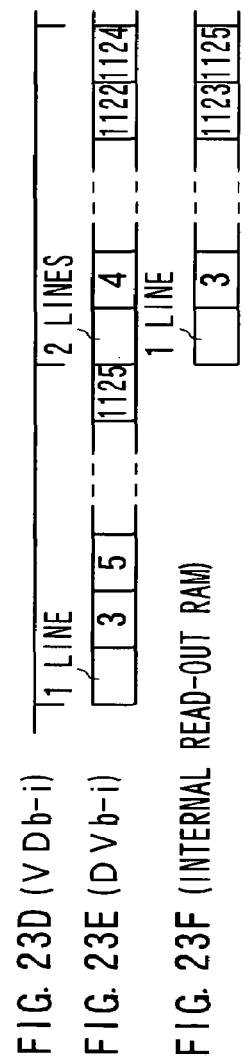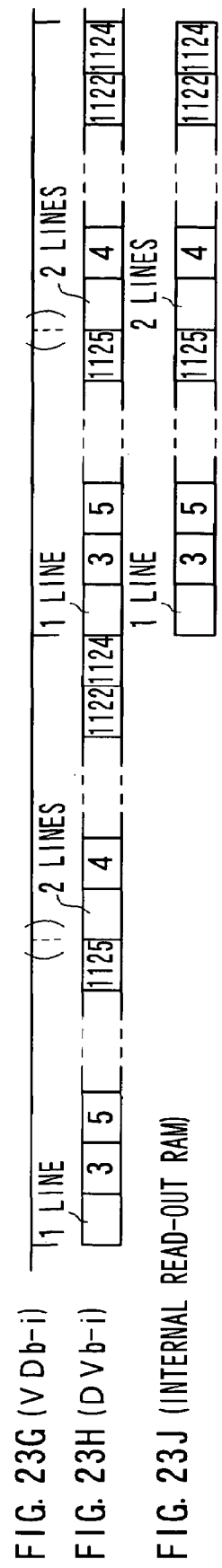

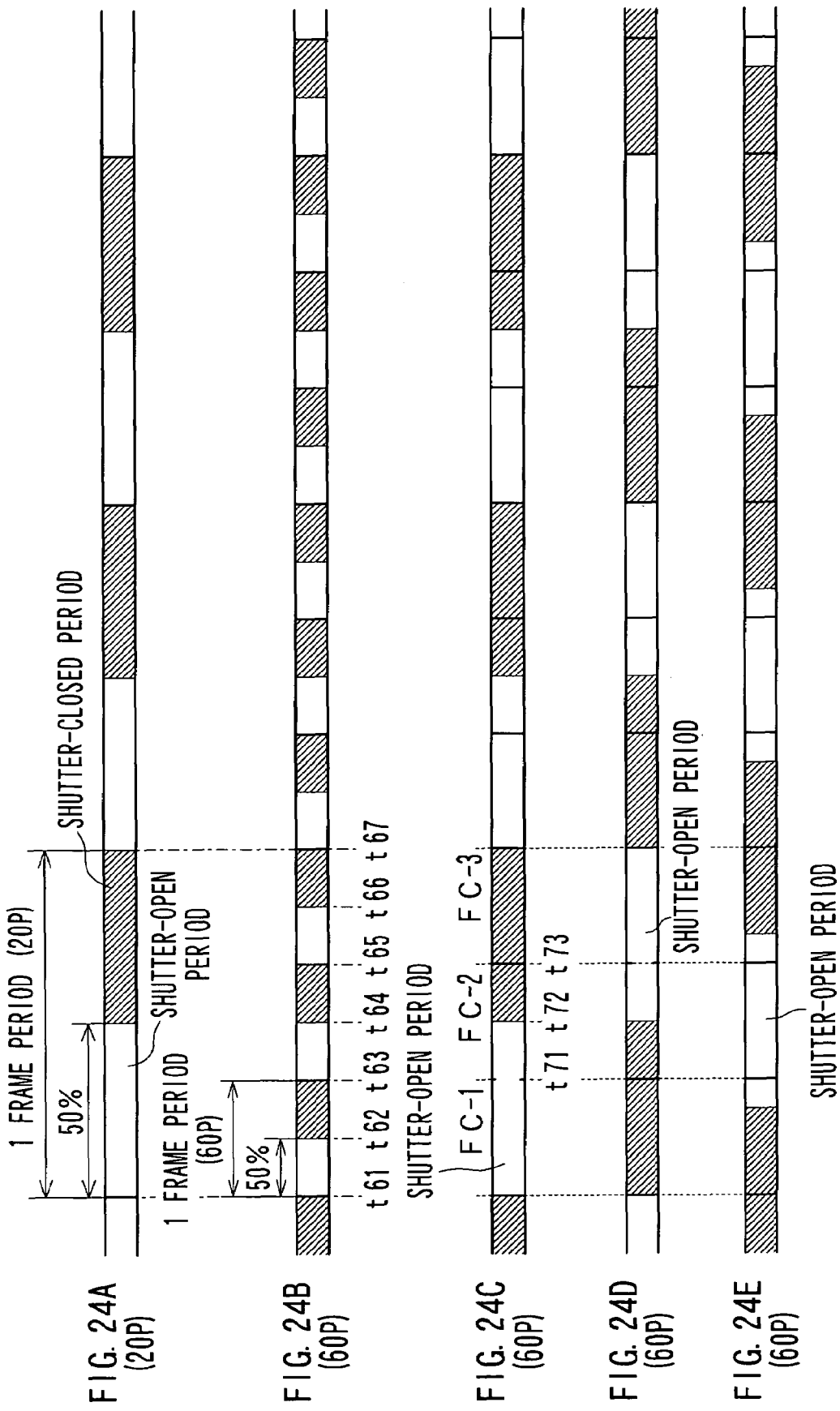

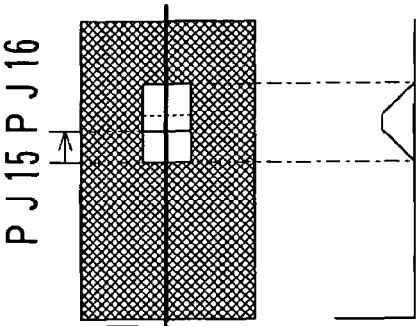
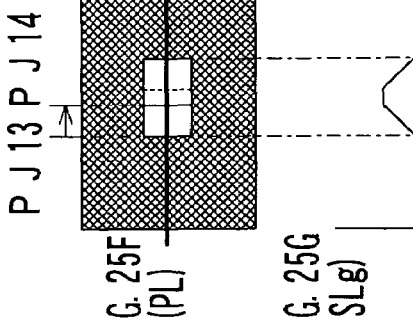
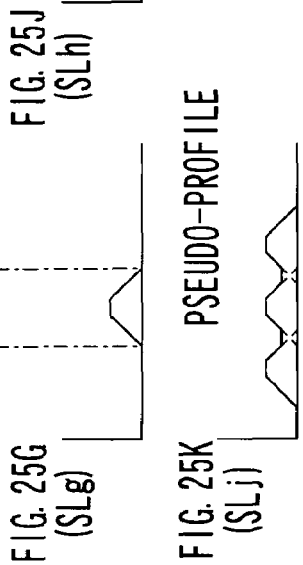
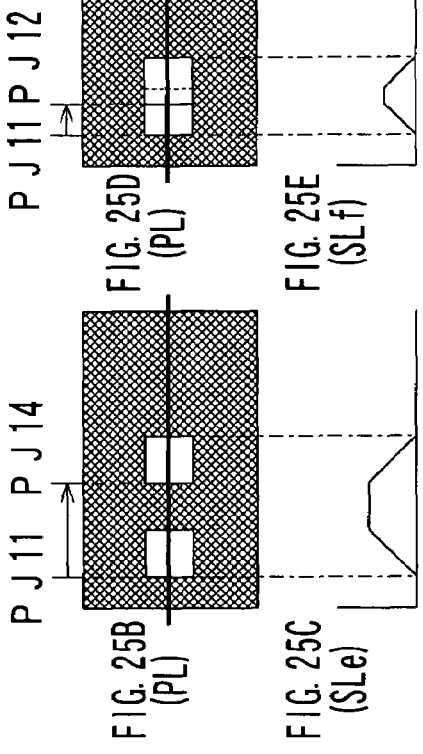
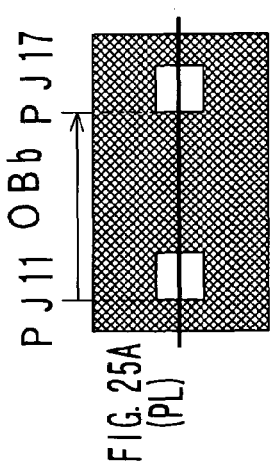

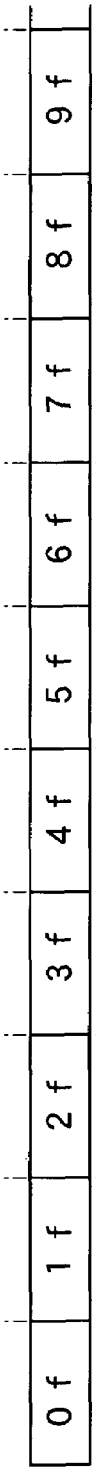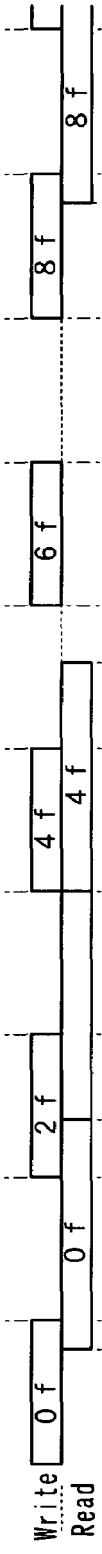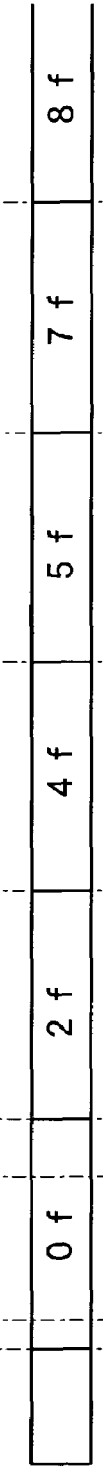
FIG. 27A (VDb)
FIG. 27B (DVb)
FIG. 27C (RAM512a) Write Read
FIG. 27D (RAM512b) Write Read
FIG. 27E (DVr)
FIG. 27F (VDr)

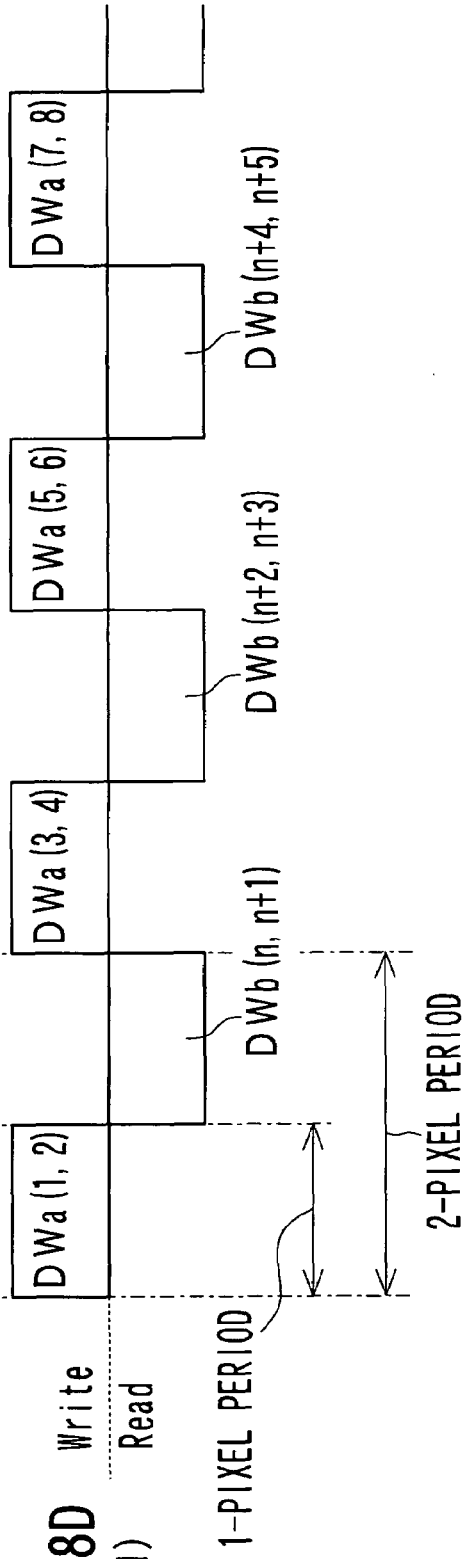
FIG. 28A (PCLK)
FIG. 28B (DVb)
FIG. 28C (DVp)
FIG. 28D (RAM)

IMAGING APPARATUS AND IMAGING METHOD

TECHNICAL FIELD

The present invention relates to an image pick-up apparatus and an image pick-up method.

BACKGROUND ART

In conventional movie making etc., in order to obtain special image effects, an image has been shot with a film camera allowing a shooting speed, that is, the number of frames per second to be altered. For example, shooting is performed at a speed higher than an ordinary one and the reproduction therefor is performed at the ordinary speed. In this case, a reproduced image provides a viewer with a high-speed motion-picture like a water drop falling down into a surface of water so that he or she can finely observe it with ease. In another case, shooting is performed at a speed lower than an ordinary one and the reproduction therefor is performed at the ordinary speed. In this case, a reproduced image provides a viewer with a realistic picture like a martial art scene or a picture with a feeling of speediness like a car chase scene.

Although digitalization of image shooting, edition, broadcasting and the like of a program has been developed in TV program making or the like, digitalization of movie making or the like has also been developed with an improvement in picture quality and a reduction in equipment costs owing to a progress in digital technologies.

By the way, if shooting an image is performed using a video camera in the digitalized movie making or the like, varying an interval of output from an image pick-up device, for example, a Charge Coupled Device (CCD), allows the image shooting speed, that is, the number of frames per unit time as described above to be altered. However, a tolerable charge storage quantity of each pixel of a CCD is predefined in accordance with a structure etc. of the image pick-up device. If charge is stored in excess of the tolerable charge storage quantity of the CCD, a trouble such as blooming occurs. Therefore, during a low-speed shooting (when the number of frames per unit time is made to be smaller than that of ordinary shooting), in order to avoid storage of charge in excess of the tolerable charge storage quantity of the CDD, it is necessary to narrow an iris down mechanically or electronically to decrease a quantity of light incident to the CCD or to reduce a shutter-open period of a mechanical or electronic shutter.

FIGS. 1A-1C show modeling of a charge storage quantity in a CCD during the ordinary shooting and the low-speed shooting. FIG. 1A indicates a case of the ordinary shooting wherein "QM" indicates a tolerable charge storage quantity of each pixel, "QA" indicates a charge storage quantity of a shot image, and "QN" indicates a charge storage quantity due to noise(s). Note that the charge storage quantity of a shot image varies with a quantity of light made incident upon the CCD per unit time.

FIG. 1B indicates the case of low-speed shooting. During low-speed shooting, if, for example, an incident light quantity is the same as that for ordinary image shooting and also a shooting speed is ⅓ times the ordinary shooting speed, a threefold charge storage period of the CCD increases. Therefore, the charge storage quantity of a shot image becomes "3QA" and that owing to noise becomes "3QN", resulting in the charge storage quantity of the shot image and that owing to noise exceeding the tolerable charge storage quantity. This causes the CCD to encounter a trouble such as the blooming described above.

FIG. 1C shows a case of low-speed shooting where an iris or the like is used to reduce a quantity of light made incident to a CCD so that the sum of a charge storage quantity of a shot image and that owing to noise may not exceed the tolerable charge storage quantity. For example, if the shooting speed is reduced to ⅓ and also the iris is narrowed to reduce an incident light quantity to ⅓ so that the same charge storage quantity may be provided, a threefold charge storage period of the CCD increases, resulting in a charge storage quantity owing to noise of "3QN" hence that of the shot image of, for example, "QB". Thus, the reduced charge storage quantity of the shot image prevents the sum of the charge storage quantity of the shot image and that owing to noise from exceeding the tolerable charge storage quantity "QM". However, a ratio of the charge storage quantity owing to noise with respect to that of the shot image increases. This causes the shot image to be deteriorated in S/N ratio, resulting in noisier picture.

Further, if the low-speed shooting is performed with a prolonged charge storage period in a CCD as described above, a shot image has a longer image update interval. Therefore, if, for example, a camera operator adjusts a shooting direction of camera to shoot a speedily moving subject at the center on a screen of the electronic viewfinder based on the image displayed on the electronic viewfinder, an actual position of the subject comes ahead a displayed position, so that no subject can be shot at a desired proper position.

DISCLOSURE OF THE INVENTION

An image pick-up apparatus according to the present invention comprises image shooting means for shooting a subject to generate an image signal having an image shooting frame rate, addition processing means for performing frame addition on the image signal having the image shooting frame rate to generate an image signal having an output frame rate, and control means for controlling a variation of the image shooting frame rate in the image shooting means and/or a switch of number of additive frames in the frame addition in the addition processing means, in accordance with output frame rate set state, to set the image signal having the output frame rate as the one having a frame rate based on the output frame rate set state.

An image pick-up method according to the present invention comprises the steps of shooting a subject to generate an image signal having an image shooting frame rate, performing frame addition on the image signal having the image shooting frame rate to generate an image signal having an output frame rate, and controlling a variation of the image shooting frame rate and/or a switch of number of additive frame in the frame addition, in accordance with output frame rate set state, to set the image signal having the output frame rate as the one having a frame rate based on the output frame rate set state.

According to the present invention, a subject is shot so that an image signal having an image shooting frame rate as the image signal of a Common Data Rate (CDR) system can be generated.

By controlling a retrace line period to be added to the image signal generated by shooting the subject, the image shooting frame rate of the image signal is made variable. An image shooting means for generating the image signal having the image shooting frame rate comprises an image pick-up device including plural photoelectric transfer elements arrayed in a matrix, for example, vertical transfer parts for vertically transferring charge read out of the plural photoelectric transfer elements, and a horizontal transfer part for horizontally transferring charge from the vertical transfer registers. Controlling the transfer operations of the vertical and horizontal transfer parts allows the retrace line period to be controlled. The image shooting frame rate thereof is set as being not less than the output frame rate. The number of additive frames is switched in accordance with the output frame rate, thereby limiting a range of variation of the image shooting frame rate to a predetermined range. Alternatively, addition switching information for limiting the range of variation of the image shooting frame rate to a predetermined range is stored and then a variation of the image shooting frame rate and/or a switch of number of additive frame in the frame addition is (are) controlled on the basis of the addition switching information. Further, at the time of performing a shutter operation, the shutter-open period is set continuously on the periods provided as many as the number of additive frames, this causing an image signal to be generated in a shutter-open period.

BRIEF DESCRIPTION OF THE DRAWINGS

FIGS. 1A-1C are illustrations each showing a relationship between an image shooting speed and a charge storage quantity;

FIGS. 2A-2H and 2J-2L are illustrations each explaining an operating principle;

FIG. 3 is a block diagram for showing the first configuration of an image pick-up apparatus;

FIG. 5 is a diagram for showing a configuration of a frame rate conversion unit;

FIGS. 7A-7G are diagrams each explaining profile compensation processing before and after frame addition;

FIG. 9 is a table showing addition switching information and an image shooting frame rate;

FIG. 10 is an illustration for showing an outline of a configuration of a FIT-type CCD;

FIGS. 12A-12C are illustrations each showing a retrace line period and an effective screen period when using a CDR system;

FIGS. 13A-13H and 13J-13N are illustrations each explaining an operation in the case of adjusting a length of a horizontal retrace line period;

FIGS. 14A-14G are illustrations each explaining operations in the case of adjusting a length of a vertical retrace line period;

FIGS. 17A-17G are illustrations each showing an operation where the number of additive frames is "2";

FIGS. 19A-19G are illustrations each showing operations where the number of additive frames is "3";

FIGS. 21A-21G are illustrations each explaining operations of varying an output frame rate (where the number of additive frames is invariable);

FIGS. 22A-22G are illustrations each explaining operations of varying the output frame rate (where the number of additive frames is variable);

FIGS. 23A-23H and 23J are illustrations each showing a frame adding method when using an interlaced scanning method;

FIGS. 24A-24E are illustrations each explaining shutter operations at the time of frame addition;

FIGS. 25A-25H and 25J-25K are illustrations each showing an image signal of a shot image at the time of shutter operation;

FIGS. 27A-27F are illustrations each showing operations of the frame rate conversion unit; and FIGS. 28A-28D are illustrations each showing operations of a configuration of another frame rate conversion unit.

BEST MODE FOR CARRYING OUT THE INVENTION

Figure 4:
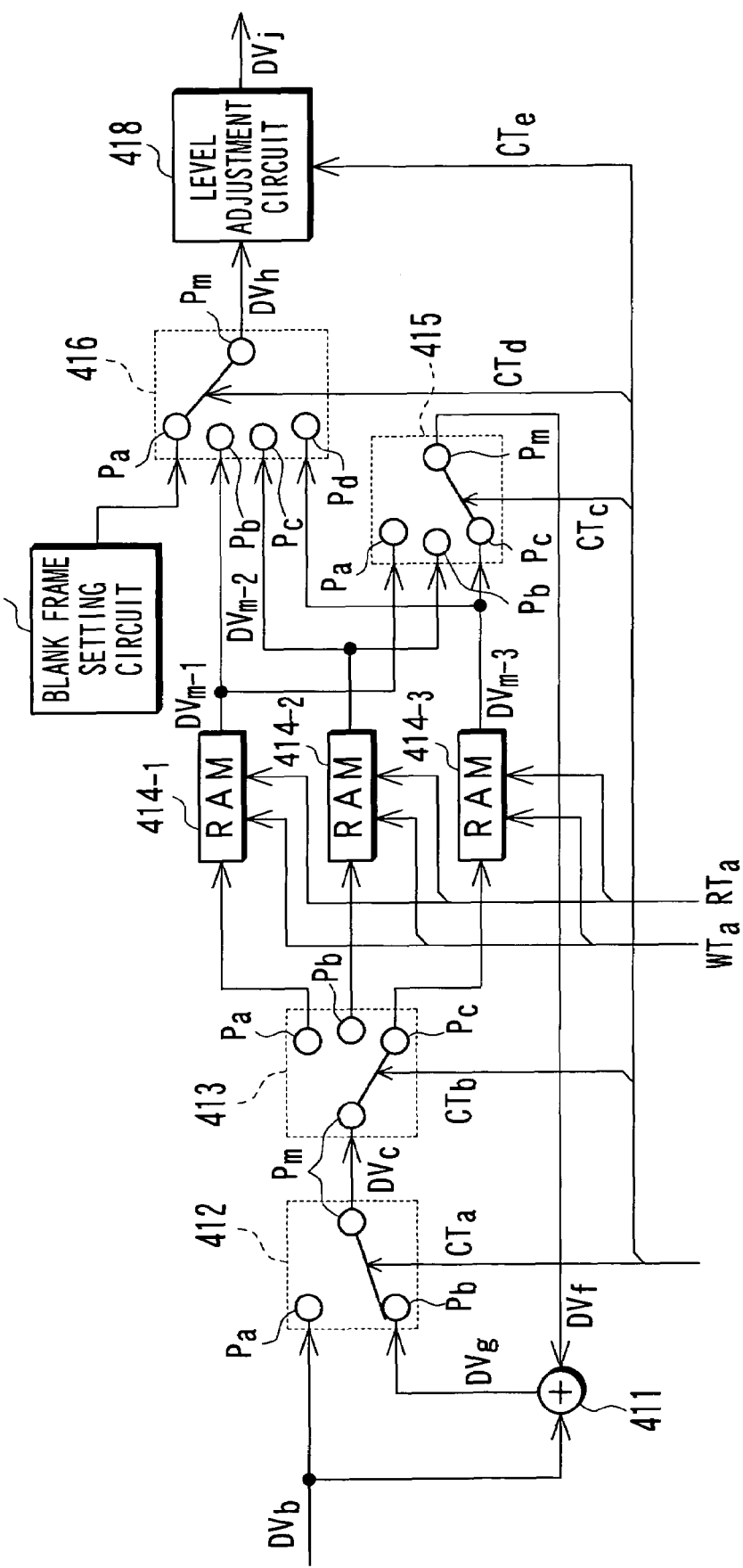
FIG. 4 is a diagram for showing a configuration of a frame addition unit.

The following will describe the present invention more in detail with reference to drawings. FIGS. 2A-2H and 2J-2L are illustrations for explaining an operating principle following a way to generate an image signal by making variable an image shooting speed (frame rate), that is, the number of frames per unit time.

When a subject OBa shown in FIG. 2A moves, for example, from a position PJ1 to a position PJ3 shown in FIG. 2B in a predetermined lapse of time if an image shooting speed is such that an image of one frame may be produced in this predetermined lapse of time, such an image as shown in FIG. 2C is given, thus providing a signal level, indicated by a solid line in FIG. 2D, of an image signal SLa at the position of a line PL. If, in this case, the image signal SLa rises in signal level with a charge storage quantity thereof reaching a charge storage tolerance, "Lp", of a relevant image pick-up device, the image signal SLa is saturated. If the image shooting speed is doubled next, the first frame image looks as though, as shown in FIG. 2E, the subject OBa moves from the position PJ1 to a position PJ2, resulting in an image signal SLb at the position of the line PL as shown in FIG. 2F. Further, an image of the subsequent frame such that the subject OBa moves from the position PJ2 to a position PJ3 appears as shown in FIG. 2G, resulting in an image signal SLc at the position of the line PL as shown in FIG. 2H. Here, an image signal SLbc at the position of the line PL obtained by adding together the images of two frames shown in FIGS. 2E and 2F respectively appears as a signal to be obtained by adding the image signals SLb and SLc together, as indicated by a solid line in FIG. 2J. This image signal SLbc is then divided by the number of additive frames of the image, resulting in an image signal SLd as indicated by a solid line in FIG. 2K. Based on this image signal SLd shown in FIG. 2K, such an image as shown in FIG. 2L is given, thus making it possible to properly display an image with the subject OBa having moved from the position PJ1 to the position PJ3 without any saturation of the image signal SLa. That is, even without setting the image shooting speed to a low value, adding the shot images together to adjust a signal level allows an image shot at the low speed to be obtained. Therefore, by the present embodiment, frames of the shot images can be added together to obtain a desired low-speed shot image without reducing the image shooting frame rate to a desired image shooting speed.

FIG. 3 is a block diagram for showing a configuration of the embodied image pick-up apparatus. Light passing through an image pick-up lens 11 and an iris 12 is made incident upon an image shooting unit 21, resulting in a subject image being formed on an image pick-up surface of the image pick-up device. Note that although the image pick-up device such as a CCD, a CMOS image pick-up device, a BBD image pick-up device may be used, the following will describe a case where the CCD is employed as the image pick-up device of the present embodiment. The CCD produces image pick-up charge of the subject image by photoelectric transfer to read out the image pick-up charge based on the drive control signal RC received from a drive unit 71 and converts it into a voltage signal. Further, the image shooting unit 21 supplies to a pre-processing unit 31 this voltage signal as a three-primary-color image signal Spa.

The pre-processing unit 31 performs processing such as correlation dual sampling processing for removing a noise component from the image signal Spa and supplies an A/D conversion unit 32 with the noise-free image signal Spa as an image signal Spb. The A/D conversion unit 32 converts the image signal Spb into a digital image signal DVa and supplies it to a feedback clamp unit 33. Further, based on an error signal received from the feedback clamp unit 33, it corrects a conversion operation when converting the image signal Spb into the image signal DVa. The feedback clamp unit 33 detects an error between a black level signal and a reference signal in the retrace lapse of time and supplies it to the A/D conversion unit 32. In such a manner, the A/D conversion unit 32 and the feedback clamp unit 33 permit the image signal DVa having a desired size at the stable black level to be obtained.

A correction processing unit 34 performs shading correction on the image signal Dva, correction processing on a defect of the image pick-up device, correction on lens aberration at the image pick-up lens 11, and the like. The image signal Dva corrected at this correction processing unit 34 is supplied as the image signal DVb to a frame addition unit 41 and also to a frame rate conversion unit 51.

Although, in the present embodiment, the three-primary-color image signal Spa is to be output from the image shooting unit 21, a luminance signal and a color-difference signal may be output instead. Further, the signal to be output is not limited to the color image signal and may be an image signal of a black-and-white image. Further, the pre-processing unit 31, the feedback clamp unit 33, the correction processing unit 34, an output signal processing unit 42 to be described later, and monitor signal processing unit 52 to be described later may be used to obtain a finely shot image. They, however, are not necessarily required in order to constitute an image pick-up apparatus of the present invention. For example, the image signal Spa may be converted in the image shooting unit 21 into a digital signal, and then this digital signal may be supplied as the image signal DVb to the frame addition unit 41 and also to the frame conversion unit 51. Further, the signal may be output neither via the output signal processing unit 42 nor via the monitor signal processing unit 52.

FIG. 4 shows a configuration of the frame addition unit 41. Based on a control signal received from a control unit 61 that corresponds to the control block 60, the frame addition unit 41 performs frame addition processing using the image signal DVb. The image signal DVb supplied from the correction processing unit 34 is supplied to an adder 411 and a terminal Pa of a signal selector 412. The adder 411 receives an image signal DVf from a signal selector 415, which will be described later, to add the image signals DVb and DVf together. A sum signal DVg obtained by this adder 411 is supplied to a terminal Pb of the signal selector 412.

A variable terminal Pm of the signal selector 412 is connected with a variable terminal Pm of a signal selector 413. The signal selector 412 selects either the image signal DVb received at the terminal Pa thereof or the sum signal DVg received at the terminal Pb thereof, based on a control signal CTa sent from a control unit 61 to be described later, and supply a selected one of these two signals as an image signal DVc to the variable terminal Pm of the signal selector 413.

The signal selector 413 connects the variable terminal Pm to any one of the three terminals Pa, Pb, and Pc thereof based on a control signal CTb sent from the control unit 61, and outputs the image signal DVc received from the signal selector 412 through a terminal thus connected to the variable terminal Pm. Note that the terminal Pa of the signal selector 413 is connected with a signal input terminal of a Random Access Memory (RAM) 414-1. Further, the terminal Pb of the signal selector 413 is connected with a signal input terminal of a RAM 414-2 and the terminal Pc is connected with a signal input terminal of a RAM 414-3.

The RAM 414-1 stores the image signal DVc received via the terminal Pa of the signal selector 413 based on a write-in control signal WTa received from the control unit 61. Further, the RAM 414-1 reads out this stored image signal DVc based on a read-out control signal RTa received from the control unit 61 and supplies it as an image signal DVm-1 to a terminal Pa of a signal selector 415 and a terminal Pb of a signal selector 416.

Similarly, the RAMs 414-2 and RAM 414-3 store the image signals DVc received via the respective terminals Pb and Pc of the signal selector 413, based on the write-in control signal WTa received from the control unit 61. Further, the RAMs 414-2 and 414-3 read out the image signals DVc stored therein based on the read-out control signal RTa received from the control unit 61 and supply them as image signals DVm-2 and DVm-3 to terminals Pb and Pc of the signal selector 415 and terminals Pc and Pd of the signal selector 416.

The variable terminal Pm of the signal selector 415 is connected with the adder 411. The signal selector 415 switches the variable terminal Pm to any one of the terminals Pa, Pb, and Pc based on a control signal CTc sent from the control unit 61, thereby selecting any one of the image signals DVm-1 through DVm-3. The image signal thus selected by this signal selector 415 is supplied as an image signal DVf to the adder 411.

The terminal Pa of the signal selector 416 is connected with a blank frame setting circuit 417. The blank frame setting circuit 417 generates an image signal DVM-B having a constant level (for example, level 0) and supplies it to the terminal Pa of the signal selector 416. The variable terminal Pm of the signal selector 416 is connected with a level adjustment circuit 418. The signal selector 416 switches the variable terminal Pm to any one of the terminals Pa, Pb, Pc, and Pd based on a control signal CTd sent from the control unit 61, to select any one of the image signals DVm-1 through DVm-3 and DVM-B, thereby generating a signal containing an image at a desired output frame rate. The signal thus selected by this signal selector 416d is supplied as an image signal DVh to the level adjustment circuit 418.

The level adjustment circuit 418 adjusts a signal level of the image signal DVh in accordance with the number of additive frames based on a control signal CTe received from the control unit 61, to supply a resultant signal as an image signal DVj to the output signal processing unit 42.

The frame rate conversion unit 51 converts a frame rate of the image signal DVb into a monitor frame rate that corresponds to an image display apparatus such as an electronic viewfinder connected for the purpose of confirmation of a shot image. FIG. 5 shows a configuration of the frame rate conversion unit 51.

The image signal DVb supplied from the correction processing unit 34 is supplied to a variable terminal Pm of a signal selector 511. A terminal Pa of the signal selector 511 is connected with a RAM 512*a*. Further, other terminal Pb is also connected with a RAM 512*b*. The signal selector 511 switches the variable terminal Pm to either the terminal Pa or the terminal Pb based on a control signal CTf sent from the control unit 61, thereby supplying the image signal DVb supplied to the variable terminal Pm to the RAM 512*a* or the RAM 512*b*.

The RAMs 512*a* and 512*b* are each constituted of RAM capable of simultaneous write-in and read-out of signals, for example, a dual-port RAM. The RAM 512*a* or the RAM 512*b* stores the image signal DVb received through the signal selector 511 based on a write-in control signal WTb received from the control unit 61. For example, the signal selector 511 switches the variable terminal Pm to either the terminal Pa or the terminal Pb for each frame to thus cause the RAM 512*a* and the RAM 512*b* to alternately store the image signal DVb having a one-frame period. Further, the RAM 512*a* or the RAM 512*b* reads out the stored image signal DVb at a speed corresponding to the monitor frame rate based on a read-out control signal RTb sent from the control unit 61 and supplies it to a terminal Pa or Pb of a signal selector 513.

The signal selector 513 switches the variable terminal Pm to either the terminal Pa or Pb based on a control signal CTg sent from the control unit 61, and outputs as an image signal DVr the signal read out of the RAM 512*a* or the RAM 512*b*. If, for example, the one-frame-period image signal DVb is stored alternately in the RAM 512*a* and the RAM 512*b*, the signals are read out of the RAM 512*a* and the RAM 512*b* in an order of the stored frames. With the variable terminal Pm of the signal selector 513 being switched for each frame, the signals are output in an order of the stored frames as the image signal DVr.

Further, if a RAM not capable of simultaneous write-in and read-out of signals is used as the RAM 512*a* and the RAM 512*b*, a bit width is increased so that the signals may be written in and read out for each two pixels. In this case, it is possible to write in the signal having a period of two pixels in one pixel period and, in the next one-pixel period, to read out the signal of two pixels. That is, storage and read-out of the image signal can be performed with one pixel delay, thus creating from the image signal DVb the image signal DVr having the monitor frame rate.

Figure 6:
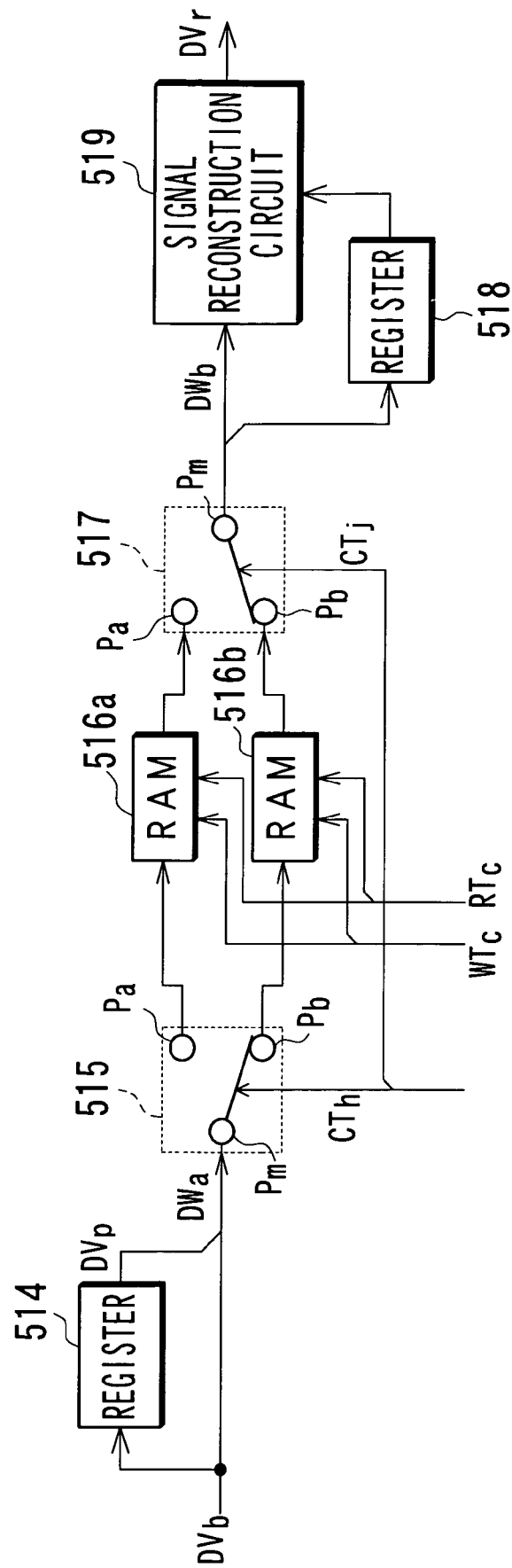
FIG. 6 is a diagram for showing a configuration of another frame rate conversion unit.

FIG. 6 shows a constitution of another frame rate conversion unit in a case where the signal is stored and read out on two-pixel basis. The image signal DVb supplied from the correction processing unit 34 is supplied to a register 514 of the frame rate conversion unit 51*a* and a variable terminal Pm of a signal selector 515.

The register 514 sequentially accumulates image signals DVb of one pixel and, at the next pixel timing, supplies these accumulated image signals DVb as an image signal DVp to the variable terminal Pm of the signal selector 515.

A terminal Pa of the signal selector 515 is connected with a RAM 516*a*. Further, its terminal Pb is connected with a RAM 516*b*. The RAMs 516*a* and 516*b* each have enough input band width (bit width) to record the image signals DVb and DVp as one signal. If, for example, the image signal DVb is an eight-bit signal, it is supposed to have a 16-bit input band width.

The signal selector 515 switches its variable terminal Pm to either its terminal Pa or Pb based on a control signal CTh sent from the control unit 61, thus supplying the image signals DVb and DVp each of one pixel supplied to the variable terminal Pm as one signal DWa to the RAM 516*a* or 516*b*.

The RAM 516*a* or 516*b* stores the signal DWa on two-pixel basis based on a write-in control signal WTc supplied from the control unit 61. Further, the signal DWa thus stored in two-pixel basis is read out at a speed that corresponds to the monitor frame rate based on a read-out control signal RTc supplied from the control unit 61 and it is supplied to a terminal Pa or Pb of a signal selector 517. Note that the signals are read out in the same order as they have been stored.

A storage capacity of each of the RAMs 516*a* and 516*b* is set in such a manner that when the signal stored on two-pixel basis is read out on two-pixel basis to generate a signal having a desired output frame rate, no new signal may be written at a storage position of the signal that have not yet read out. If, for example, a frame rate of the image signal DVb is varied within a range of one to two times the monitor frame rate, which is a frame rate of the image signal DVr, as described later, the storage capacity is set so that at least a two-frames period of the image signal DVb may be stored. In this case, the variable terminal Pm is switched, for example, for each frame to cause the RAMs 516*a* and 516*b* to alternately store the signal Dwa of one frame. Alternatively, the variable terminal Pm is switched each time the signal is written, to cause the one-frame signal DWa to be stored in a first half portion of each of the RAMs 516*a* and 516*b*, and to cause the other one-frame signal DWa to be stored in a second half portion of each of the RAMs 516*a* and 516*b*. By thus setting it, it is possible to store and read out the signal almost simultaneously as well as to prevent a new signal from being written at a storage position of a signal that have not read out even if the frame rate of the image signal DVb is varied, thereby properly generating a signal having the monitor frame rate.

A variable terminal Pm of the signal selector 517 is connected with a register 518 and a signal reconstruction circuit 519. The signal selector 517 switches its variable terminal Pm to either its terminal Pa or Pb based on a control signal CTj sent from the control unit 61, thus outputting through the variable terminal Pm a signal read out of the RAM 516*a* or 516*b* as a signal DWb. This signal DWb is equal to the signal DWa, having a frame rate equal to the monitor frame rate. In this case, a portion of the signal DWb that corresponds to the image signal DVb is supplied to the register 518, while its portion that corresponds to the image signal DVp is supplied to the signal reconstruction circuit 519.

Since a pixel of the image signal DVp and that of the image signal DVb are contained in this order in the signal DWa, the signal reconstruction circuit 519 alternately outputs a signal of a portion that corresponds to the image signal DVp as a one-pixel image signal and then a signal of a portion that corresponds to the image signal DVb held in the register 518 as the next one-pixel image signal. The image signals output from this signal reconstruction circuit 519 are supplied as the image signal DVr to the monitor signal processing unit 52.

The output signal processing unit 42 performs the processing such as γ correction (gamma correction), profile compensation processing, and Knee correction on the image signal DVj output from the frame addition unit 41. Further, the monitor signal processing unit 52 performs the processing on the image signal DVr output from the frame rate conversion unit 51. Note that the processing is performed by the monitor signal processing unit 52 in accordance with an image display apparatus connected for the purpose of confirmation of a shot image. For example, in a case where the shot image is displayed using a CRT or an LCD in order to confirm it, the processing is performed corresponding to a γ characteristic, a gradation display characteristic, etc. of the CRT or the LCD. In such a manner, by providing the output signal processing unit 42 and the monitor signal processing unit 52, it is possible to perform the processing on the image signal DVj and that on the image signal DVr independently of each other.

Further, since the output signal processing unit 42 for performing the processing is provided at a subsequent stage of the frame addition unit 41, the processing can be performed properly. The following will describe the knee correction performed in the case of, for example, adding four frames of the image signal DVb together. It is supposed that a signal level at a pixel position OD is "100" in frame 1, "90" in frame 2, "40" in frame 3, and "30" in frame 4. One example of the knee correction processing is assumed here where such a portion of a signal having a signal level in excess of "50" has its signal level halved.

When the knee correction is performed before frame addition, the signal level of frame 1 has "(100−50)/2+50=75" by the knee correction. The signal level of frame 2 has "(90−50)/2+50=70" by the knee correction. Therefore, a total sum of the four frames of the signal levels becomes "75+70+40+30=215". When the knee correction is performed after the frame addition, the total sum of the signal levels becomes "100+90+40+30=260". Further, since the four frames of the signals are added together, a portion of the signal having a signal level in excess of "50×4" has its signal level halved by the knee correction. Therefore, a total sum of the four frames of the signal levels becomes "(260−200)/2+200=230".

Thus, a portion having its signal level compressed by the knee correction and that having its signal level not compressed by it are handled equally and added together when the knee correction is performed before the frame addition, result in the improper knee correction. However, providing the output signal processing unit 42 at the subsequent stage of the frame addition unit 41 allows the proper knee correction to be performed in accordance with a shot image in the output signal processing unit 42.

Similarly, when the γ correction is performed before frame addition, a signal level is corrected at different ratios in different frames, so that portions where the signal level has been adjusted at the different ratios are handled equally and added together, resulting in the improper γ correction as in the case of the knee correction. Therefore, providing the output signal processing unit 42 at the subsequent stage of the frame addition unit 41 allows the proper γ correction to be performed in the output signal processing unit 42 in accordance with the shot image.

Further, when the profile compensation processing is also performed before the frame addition, the profile compensation may not sufficiently be performed in some cases. FIGS. 7A-7G are diagrams each explaining profile compensation processing before and after the frame addition.

The following will describe a case where a signal of a frame F1 shown in FIG. 7A and a signal of a frame F2 shown in FIG. 7B are added together. When the profile compensation processing is performed before the frame addition, a compensation signal DL1 is generated using signals of a pixel OG and pixels on both sides thereof as shown in FIG. 7C and added to a signal of the pixel OG as shown in FIG. 7C. If, then, its signal level exceeds a dynamic range LD, the signal becomes the same as that clipped if nothing is done in particular. Further, a compensation signal DL2 is generated using signals of a pixel OG and pixels on both sides thereof as shown in FIG. 7B and added to a signal of the pixel OG as shown in FIG. 7D. Therefore, when the profile compensation processing is performed and then the frame addition is performed, the pixel OG have a signal level shown in FIG. 7E.

When the profile compensation processing is performed after the frame addition, on the other hand, a signal obtained by the frame addition appears as shown in FIG. 7F. When the profile compensation processing is performed on the pixel OG of the signal obtained by this frame addition, a compensation signal DL3 is generated using the signal thus obtained of the pixel OG and additive signals of pixels on both sides thereof and added to the signal of the pixel OG as shown in FIG. 7G. In this case, since the signals of two frames have been added together, the dynamic range becomes "2LD", thereby preventing the signal thus added of the pixel OG from being clipped and making the signal level thereof larger than that in the case of FIG. 7E. Therefore, performing the profile compensation processing after the frame addition also allows the proper profile compensation processing to be performed.

In such a manner, the output signal processing unit 42 performs the processing using the image signal DVj, which is a signal obtained after the frame addition, to supply the signal output unit 43 with a image signal DVk thus obtained. Further, the monitor signal processing unit 52 performs the processing in accordance with an image display apparatus used for the confirmation of a shot image, as described above, on the image signal DVr, which is a signal obtained after the frame rate conversion, to obtain an image signal DVs, and supplies the signal output unit 53 with the image output signal DVs thus obtained.

The signal output unit 43 coverts the image signal DVk into a signal CMout in accordance with a recording device and the like connected to the present image pick-up apparatus. When, for example, a device corresponding to a component signal or that corresponding to a composite signal is connected with the image pick-up apparatus, the image signal DVk is converted into a signal CMout that corresponds to each of these devices and output it. Further, when an image signal is transmitted through a serial digital interface standardized as SMPTE259M or SMPTE292M, and the like, a transmission signal that complies with an interface standard is generated on the basis of the image signal DVk and output it as the signal CMout.

The signal output unit 53 converts the received image signal DVs into a signal MTout in accordance with an image display apparatus connected for the confirmation of a shot image and outputs it. When, for example, the image display apparatus uses an analog signal, the image signal DVs is converted into the analog signal and output as the signal MTout.

To the control unit 61, an operation unit 62 is connected. When this operation unit 62 is operated by a user of a video camera, an operation signal RS that corresponds to the user's operation is supplied from the operation unit 62 to the control unit 61. The control unit 61 generates a control signal or the like based on this operation signal RS, to control operations of each of the units, thus operating the image pick-up apparatus in accordance with the user's operations. Further, when a frame rate setting signal RSF for determining an output frame rate set state is supplied to the control unit 61, the operation unit 62, for example, switches an image shooting speed at the operation unit 62. When the frame rate setting signal RSF is then supplied as the operation signal RS to the control unit 61 or when the frame rate setting signal RSF sent from a remote controller or an external device is supplied to the control unit 61, the control unit 61 generates the control signals CTa-CTj, the write-in control signals WTa-WTc, and the read-out control signals RTa-RTc and supplies them to the frame addition unit 41, the frame rate conversion unit 51, or a frame rate conversion unit 51a, thereby generating an image signal according to a switched image shooting speed. Furthermore, the control unit 61 generates a control signal TC for setting a frame rate to be used at the image shooting unit 21 on the basis of the frame rate setting signal RSF, and supplies it to a drive unit 71. The drive unit 71 generates a drive control signal RC based on the control signal TC and supplies it to the image shooting unit 21. Therefore, the image signal Spa having an image shooting frame rate that corresponds to a switched image shooting speed is output from the image shooting unit 21. Note that the control unit 61 also controls the iris 12 or the like.

The following will describe operations of the image pick-up apparatus. The image pick-up apparatus controls a variation of the image shooting frame rate of the image signal Spa generated by the image shooting unit 21 and/or a switch of the number of additive frames in the frame addition unit 41, thus generating the image signal DVj having a desired output frame rate.

Note that when generating the image signal DVj having a desired output frame rate FRc, the number of additive frames FA employed at the frame addition unit 41 is switched so that the image shooting frame rate FRp, which is a frame rate of the image signal Spa generated by the image shooting unit 21, may fall in a predetermined range, even if the output frame rate FRc is low in value. Further, the number of additive frames FA is set in such a manner that the image shooting frame rate FRp may be high in value even within the predetermined range, for example, when the number of additive frames FA is switched.

Figure 8:
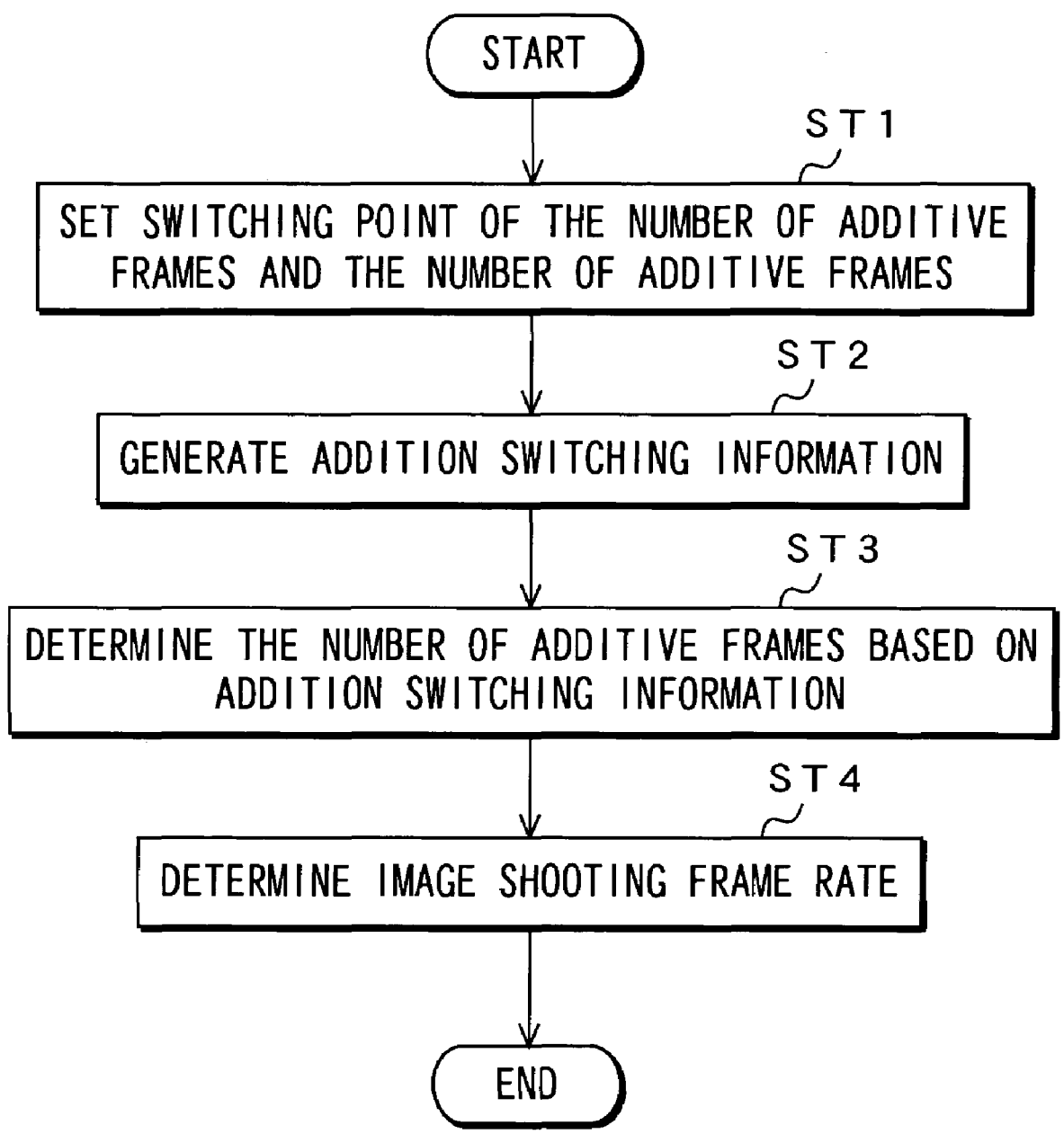
FIG. 8 is a flowchart for showing setting operation of the number of additive frames FA in accordance with an output frame rate FRc and of an image shooting frame rate FRp.

FIG. 8 is a flowchart for showing setting operations of the number of additive frames FA in accordance with the output frame rate FRc and of the image shooting frame rate FRp. At step ST1, a switching point of the number of additive frames and the number of additive frames are set. In setting, the image shooting frame rate FRp is divided by a positive integer, so that an integer value (except 1) obtained as the division result is defined to be a switching point. The division result is defined to be the number of additive frames FA. For example, if a maximum value of the image shooting frame rate FRp is "60P (a numeral indicates the number of frames per second and "P" indicates a signal of the progressive system, which have a similarity to the other cases)", the set switching point of the additive frames and number of additive frames are as follows: (30P, 2 frames); (20P, 3 frames); (15P, 4 frames); (12P, 5 frames); (2P, 30 frames); and (1P, 60 frames).

At step ST2, addition switching information that indicates a relationship between the output frame rate FRc and the number of additive frames is created on the basis of a switching point of the number of additive frames and the number of additive frames that have been set at step ST1. If, in this case, the switching point of the number of additive frames and the number of additive frames are set as described above on the assumption that the maximum value of the image shooting frame rate FRp is 60P, such addition switching information as shown in FIG. 9 is created. That is, if the output frame rate FRc is "60P≧FRc>30P", the number of additive frames FA is set to "1". If the output frame rate FRc is "30P≧FRc>20P", the number of additive frames FA is set to "2". If the output frame rate FRc is "20P≧FRc>15P", the number of additive frames is set to "3". Similarly, if the output frame rate FRc is "2P≧FRc>1P", the number of additive frames FA is set to "30" and, if the output frame rate FRc is "FRc=1P", the number of additive frames FA is set to "60".

At step ST3, the number of additive frames that corresponds to an output frame rate FRc set by the user is determined on the basis of the addition switching information. If, for example, the set output frame rate FRc is "45P", the number of additive frames FA is determined as "1". Further, if the output frame rate FRc is "14P", the number of additive frames FA is determined as "4".

At step ST4, an image shooting frame rate is determined. This image shooting frame rate FRp is determined as a result obtained by multiplying the number of additive frames FA determined at step ST3 by the set output frame rate FRc. If, for example, the output frame rate FRc is "45P", the image shooting frame rate FRp is determined as "45P" because the number of additive frames FA is "1". Further, if the output frame rate FRc is "14P", the image shooting frame rate FRp is determined as "56P" because the number of additive frames FA is "4". Further, if the output frame rate FRc is varied, a variable range of the image shooting frame rate FRp is shifted to the maximum value side thereof. If, for example, the output frame rate FRc is varied in a range of "20P≧FRc>15P", the variable range of the image shooting frame rate FRp is "60P≧FRp>45P", which is shifted to the maximum value side thereof. Note that FIG. 10 shows, together with the addition switching information, a range of the image shooting frame rate FRp with respect to a range of the output frame rate FRc.

Thus, even if the output frame rate FRc is varied in a range of "60P to 1P", the number of additive frames can be switched, thereby keeping the image shooting frame rate FRp limited to a range of "60P to 30P". Further, since the variable range of the image shooting frame rate FRp with respect to each value of the number of additive frames is set on the maximum value side of the image shooting frame rate FRp, it is possible to obtain the image signal DVj having a desired output frame rate based on the image signal Spa shot at a higher speed.

The control unit 61 performs the above-mentioned processing of FIG. 8, to determine an image shooting frame rate FRp with respect to an output frame rate FRc set by the frame rate setting sign al RSF sent from the operation unit 62, and the number of additive frames FA.

In a case where the output frame rate FRc of the image signal DVj is set in a range of "60P≧FRc>30P" based on the frame rate setting signal RSF in order to output from the image pick-up apparatus the signal CMout generated on the basis of this image signal DVj, the control unit 61 controls the frame addition unit 41 so as to set the number of additive frames FA to "1". Further, it controls operations of the drive unit 71 so as to cause the drive unit 71 to supply the image shooting unit 21 with the drive control signal RC that sets the image shooting frame rate FRp of the image signal Spa output from the image shooting unit 21 to a value obtained by multiplying the output frame rate by FA.

Further, when the output frame rate FRc is set in a range of "30P≧FRc>20P" based on the frame rate setting signal RSF, the control unit 61 controls the frame addition unit 41 so as to set the number of additive frames to "2". Further, the control unit 61 controls operations of the drive unit 71 so as to cause the drive unit 71 to supply the image shooting unit 21 with the drive control signal RC that sets the image shooting frame rate FRp of the image signal Spa output from the image shooting unit 21 to a value obtained by multiplying the output frame rate FRc by FA (2). In this case, since the image signals of two frames having the image shooting frame rate are added to generate the image signal DVj, the image signal DVj has a desired output frame rate. Further, since the image shooting frame rate FRp falls in a range of "60P≧FRp>40P", it is possible to set the image shooting frame rate in a range of "60P≧FRp>30P".

Similarly, when setting the output frame rate FRc in a range of "15P≧FRc>12P", the control unit 61 controls the frame addition unit 41 so as to set the number of additive frames FA to "4". Further, the control unit 61 controls the drive unit 71 so as to cause the drive unit 71 to supply the image shooting unit 21 with the drive control signal RC that sets the image shooting frame rate FRp of the image signal Spa output from the image shooting unit 21 to a value obtained by multiplying the output frame rate FRc by FA (4). In this case, since the image signals of four frames having the image shooting frame rate are added to generate the image signal DVj, the image signal DVj has a desired output frame rate. In this case, since the image shooting frame rate FRp is set in a range of "60P≧FRp>40P", it is possible to set the image shooting frame rate in a range of "60P≧FRp>30P".

Similarly, varying the image shooting frame rate FRp of the image signal Spa generated by the image shooting unit 21 and the number of additive frames FA given by the frame addition unit 41 allows the image signal DVj having a desired output frame rate FRc to be obtained. Note that by holding the table shown in FIG. 9 beforehand, it is, of course, unnecessary to perform processing of the flowchart of FIG. 8 each time the output frame rate FRc is switched.

The following will describe an operation of varying the image shooting frame rate FRp of the image signal Spa generated by the image shooting unit 21. FIG. 10 shows a configuration of a Frame Interline Transfer (FIT) typed CCD as an example of the image pick-up device used in the image shooting unit 21. An image pick-up region 211a of a CCD 210 comprises photoelectric transfer elements 212 arrayed in a matrix and vertical transfer registers 214 for transferring to an accumulation region 211b image pick-up charge supplied from the each photoelectric transfer element 212 via sensor gates 213. The vertical transfer registers 214 are provided as many as a numeral that corresponds to the number of each line of pixels. The number of transfer stages of each of the vertical transfer registers 214 is supposed to correspond to the number of scanning lines.

The accumulation region 211b of the CCD 210 is provided to accumulate the image pick-up charge of, for example, one frame of pixels and constituted of a vertical transfer register 215 having a configuration similar to that of the vertical transfer register 214 of the image pick-up region 211a.

Further, the image shooting unit 21 has a horizontal transfer register 216 and a signal output circuit 217 connected to an output end of the horizontal transfer register 216. The number of transfer stages of the horizontal transfer register 216 is supposed to correspond to the number of pixels of one line. Further, the signal output circuit 217 converts the image pick-up charge received from the horizontal transfer register 216 into a voltage signal and outputs it.

The image shooting unit 21 having such a configuration receives from the drive unit 71 as the drive control signal RC a variety of timing signals such as a sensor gate pulse for opening each of the sensor gates 213, a vertical transfer clock pulse for driving the vertical transfer register 214, a vertical transfer clock pulse for driving the vertical transfer register 215 in the accumulation region 211b, a horizontal transfer clock pulse for driving the horizontal transfer register 216, and the like, thus controlling the operations of the image shooting unit 21.

Image pick-up charge generated at each of the photoelectric transfer elements 212 in the image pick-up region 211a is read out via the sensor gate 213 to each of the vertical transfer registers 214 in a vertical retrace line period and then the image pick-up charge thus read is transferred at a high speed and accumulated into the vertical transfer register 215 in the accumulation region 211b. Thereafter, the image pick-up charge accumulated in the accumulation region 211b is read out to the horizontal transfer register 216 by as much as one line in a horizontal retrace line period and then the image pick-up charge thus read is sequentially transferred to the signal output circuit 217. The signal output circuit 217 converts the image pick-up charge thus supplied into a voltage signal and outputs it. Therefore, it is possible to obtain a one-line's image signal from the signal output circuit 217. In the next horizontal scanning period also, similar processing can be performed to obtain the next one-line's image signal from the signal output circuit 217. Similarly, one-frame's image signal can be obtained.

Thereafter, the signals are swept out of the vertical transfer register 214 in the vertical retrace line period to reduce smears, and then the image pick-up charge generated by the photoelectric transfer element 212 is read out via the sensor gate 213 to each of the vertical transfer registers 214, thus performing the above-mentioned processing.

Figure 11:
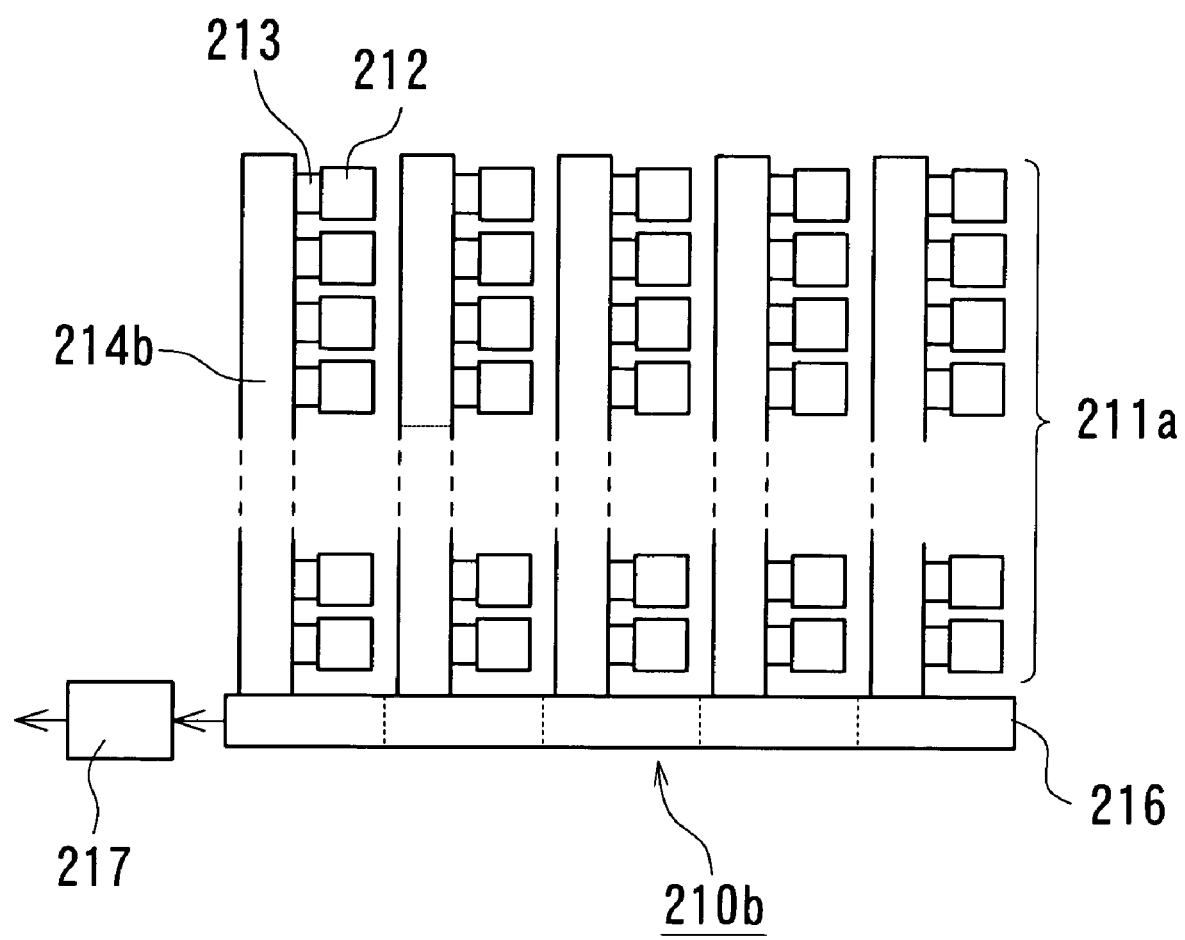
FIG. 11 is an illustration for showing an outline of a configuration of an IT-type CCD.

Note that the image pick-up device used in the image shooting unit 21 is not limited to the FIT-type CCD and may be a Frame Interline Transfer (IT) typed CCD shown in FIG. 11. This IT-type CCD 210b has no accumulation region 211b of the FIT-type CCD, and the image pick-up charge generated at the photoelectric transfer element 212 of the image pick-up region 211a is read out to a vertical transfer register 214b in charge of a buffer function via the sensor gate 213 in the vertical retrace line period. The image pick-up charge thus read out to this vertical transfer register 214b is read out each time by as much as one line to a horizontal transfer register 216 sequentially in a horizontal retrace line period. Furthermore, the image pick-up charge thus read out to this horizontal transfer register 216 is handled according to the same way as in the case of the FIT-type CCD, thereby obtaining a one-frame's signal from the signal output circuit 217, so that by performing the above-mentioned processing for each frame, the image signal Spa can be generated.

When varying the image shooting frame rate FRp of the image signal Spa, controlling a charge storage period, an image pick-up charge read-out timing, etc. in the CCD 210 or 210b based on the drive control signal RC supplied from the drive unit 71 to the image shooting unit 21 allows the image signal Spa having a varied image shooting frame rate FRp to be obtained. Further, when varying the image shooting frame rate FRp using the CDR system, the image signal Spa having a constant image size during the effective screen period is generated even if the image shooting frame rate FRp varies. By using the CDR system, it is unnecessary to vary operational frequency of each part using the image shooting frame rate FRp in accordance with the image shooting frame rate Frp, thereby simplifying a constitution thereof.

According to this CDR system, by adjusting a length of the horizontal retrace line period as shown in FIG. 12B or that of the vertical retrace line period as shown in FIG. 12C on an image signal of which a retrace line period and an effective screen period are set as shown in FIG. 12A, it is possible to generate the image signal having a varied image shooting frame rate FRp without changing an image size during the effective screen period.

FIGS. 13A-13H and 13J-13N are illustrations for explaining operations in the case of adjusting the length of the horizontal retrace line period and FIGS. 14A-14G are illustrations for explaining operations in the case of adjusting the length of the vertical retrace line period. FIG. 13A shows an exposure starting timing TMs and FIG. 13B, an exposure ending timing TMe. An interval of the exposure starting timing TMs and that of the exposure ending timing TMe are equal to a frame period of the image shooting frame rate FRp, while a period from an exposure ending timing to the next exposure starting timing corresponds to a vertical retrace line period V.BLK as shown in FIG. 13C. Further, a period from an exposure starting timing to the next exposure ending timing provides an exposure period.

Image pick-up charge generated at the photoelectric element 212 in the exposure period is read out, as shown in FIG. 13D, to the vertical transfer register 215 shown in FIG. 10 or to the vertical transfer register 214b shown in FIG. 11 in the next vertical retrace line period V.BLK.

The charge read out to the vertical transfer register 215 or the vertical transfer register 214b is read out to the horizontal transfer register 216 for each line using each read-out starting pulse of a horizontal read-out starting signal TMh shown in FIG. 13G as a reference and then supplied sequentially to a signal output circuit 217 at a sampling frequency, thus generating a signal having a one-line's duration in the effective screen period in the image signal Spa as shown in FIG. 13E. Note that FIG. 13F shows a vertical sync signal VD.

FIGS. 13H, 13J, and 13K show a partially expanded frame period, FIG. 13H shows a horizontal sync signal HD, and FIG. 13J shows the horizontal read-out starting signal TMh, which provides a reference for generating a one-line's signal in the effective screen period as described above. In this case, a period from a synchronous pulse of the horizontal sync signal HD to a read-out starting pulse of the horizontal read-out starting signal TMh corresponds to a horizontal retrace line period H.BLK in the image signal Spa shown in FIG. 13K, while a period from a read-out starting pulse of the horizontal read-out starting signal TMh to a synchronous pulse of the next horizontal sync signal HD provides the effective screen period.

FIGS. 13L-13N show the operations when the image shooting frame rate FRp is high in value, FIG. 14N shows the horizontal sync signal HD, and FIG. 14M shows the horizontal read-out starting signal TMh. In this case, if the horizontal retrace line period H.BLK as shown in FIG. 13K, which is a period from a synchronous pulse of the horizontal sync signal HD to a read-out starting pulse of the horizontal read-out starting signal TMh, is shortened to the one shown in FIG. 13L, an interval of the horizontal sync signal HD is decreased to increase the image shooting frame rate FRp. Further, a period from a read-out starting pulse of the horizontal read-out starting signal TMh to a synchronous pulse of the next horizontal sync signal HD is made constant. That is, by making constant the sampling frequency and the number of pixels in the effective screen period, it is possible to generate such an image signal Spa of the CDR system shown in FIG. 13K or FIG. 13L of which the effective screen period is made constant irrespective of the image shooting frame rate FRp. Note that FIGS. 13A-13H and FIG. 13J-13K show the number of lines and that of samples in a case where the effective screen period is "48P" for 1920 samples×1080 lines and FIGS. 13L-13N show the number of lines and that of samples in a case where the effective screen period is "60P" for 1920 samples× 1080 lines.

The following will describe operations of adjusting the length of the vertical retrace line period with reference to FIGS. 14A-14G. Note that FIGS. 14A-14D correspond to FIGS. 13A-13D respectively.

Charge read out to the vertical transfer register 214b or the vertical transfer register 215 is read out each time by as much as one line to the horizontal transfer register 216 using a read-out starting pulse of the horizontal read-out starting signal TMh shown in FIG. 14G as a reference and then the charge thus read is sequentially supplied to the signal output circuit 217, thus generating the image signal Spa shown in FIG. 14E. In this case, the vertical retrace line period V.BLK is adjusted, which is a period from a synchronous pulse of the vertical sync signal VD shown in FIG. 14F to a read-out starting pulse of the first horizontal read-out starting signal TMh in each frame shown in FIG. 14G. Further, by making equal a period from a read-out starting pulse of the first horizontal read-out starting signal TMh to a synchronous pulse of the vertical sync signal VD, it is possible to generate such an image signal Spa of the CDR system shown in FIG. 14E of which the effective screen period is made constant irrespective of the image shooting frame rate FRp.

In such a manner, by making the sampling frequency and the number of pixels in the effective screen period constant and varying the horizontal retrace line period and the vertical retrace line period in accordance with the image shooting frame rate FRp, it is possible to generate an image signal Spa having an invariable image size with the effective screen period staying constant even if the image shooting frame rate is made variable. Note that if, for example, the vertical retrace line period is prolonged in accordance with the image shooting frame rate FRp, a lapse of time until the next frame image is displayed is prolonged so that flickers may be conspicuous. Therefore, it is preferable to adjust the horizontal retrace line period in accordance with the image shooting frame rate FRp.

Further, by controlling a charge storage period, an image pick-up charge read-out timing, etc. in the CCD 210 or 210b, it is possible not only to obtain the image signal Spa having a variable image shooting frame rate FRp but also to perform electronic shutter operations. In this case, the control unit 61 controls operations of the drive unit 71 to thus adjust a timing of the drive control signal RC supplied from the drive unit 71 to the image shooting unit 21, thereby causing the image shooting unit 21 to perform electronic shutter operations. For example, image pick-up charge generated at the photoelectric transfer element 212 in a shutter-open period (exposure period) is read out to the vertical transfer register 214 and that generated at the photoelectric transfer element 212 in the other period is discarded. By generating the image signal Spa based on the image pick-up charge generated in this shutter-open period, electronic shutter operations can be performed. Further, another electronic shutter operation can be performed also by reading out the image pick-up charge generated at the photoelectric transfer element 212 in accordance with moments of starting and ending of the shutter-open period, invalidating the image pick-up charge read out at the starting timing of the shutter-open period, and generating the image signal Spa based on the image pick-up charge read out at the ending timing of the shutter-open period. Note that the shutter operations are performed not only when an electronic shutter is used but also when a mechanical shutter or a so-called optical shutter etc. by use of an LCD etc. is used.

Figure 15:
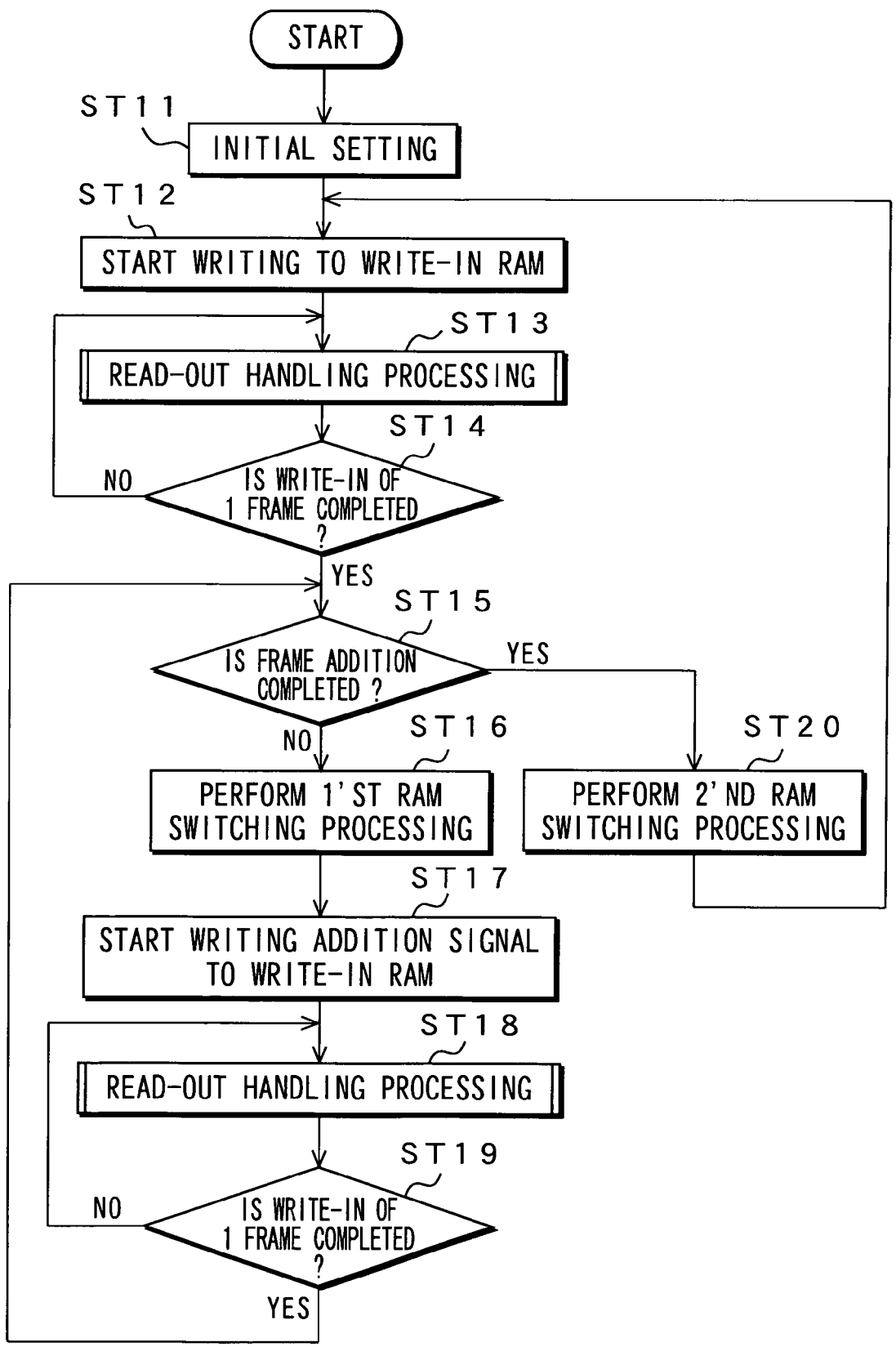
FIG. 15 is a flowchart for showing frame addition operations.

The following will describe frame addition operations performed by the frame addition unit 41. FIG. 15 is a flowchart for showing frame addition operations.

At step ST11, initial setting is performed. In this initial setting, any one of the RAMs 414-1 through 414-3 is specified as a write-in RAM for write-in of the image signal DVc. Switching the variable terminal Pm of the signal selector 413 using the control signal CTb allows the write-in RAM to be specified. Further, an external read-out enable flag for indicating whether or not the addition processing of frames as many as the number of additive frames FA is completed is provided and then a state of the external read-out enable flag is set to OFF state indicating that the frame addition processing has not yet completed.

At step ST12, the write-in control signal WTa is supplied to the write-in RAM, to allow the write-in RAM to start writing the image signal DVc thereto.

At step ST13, read-out handling processing is performed. This read-out handling processing is performed to output an image signal at the output frame rate FRc. When frame addition is completed, an image signal having the output frame rate FRc is generated on the basis of a signal obtained by the frame addition and output. When frame addition has not yet completed, it is defined to be a blank frame.

Figure 16:
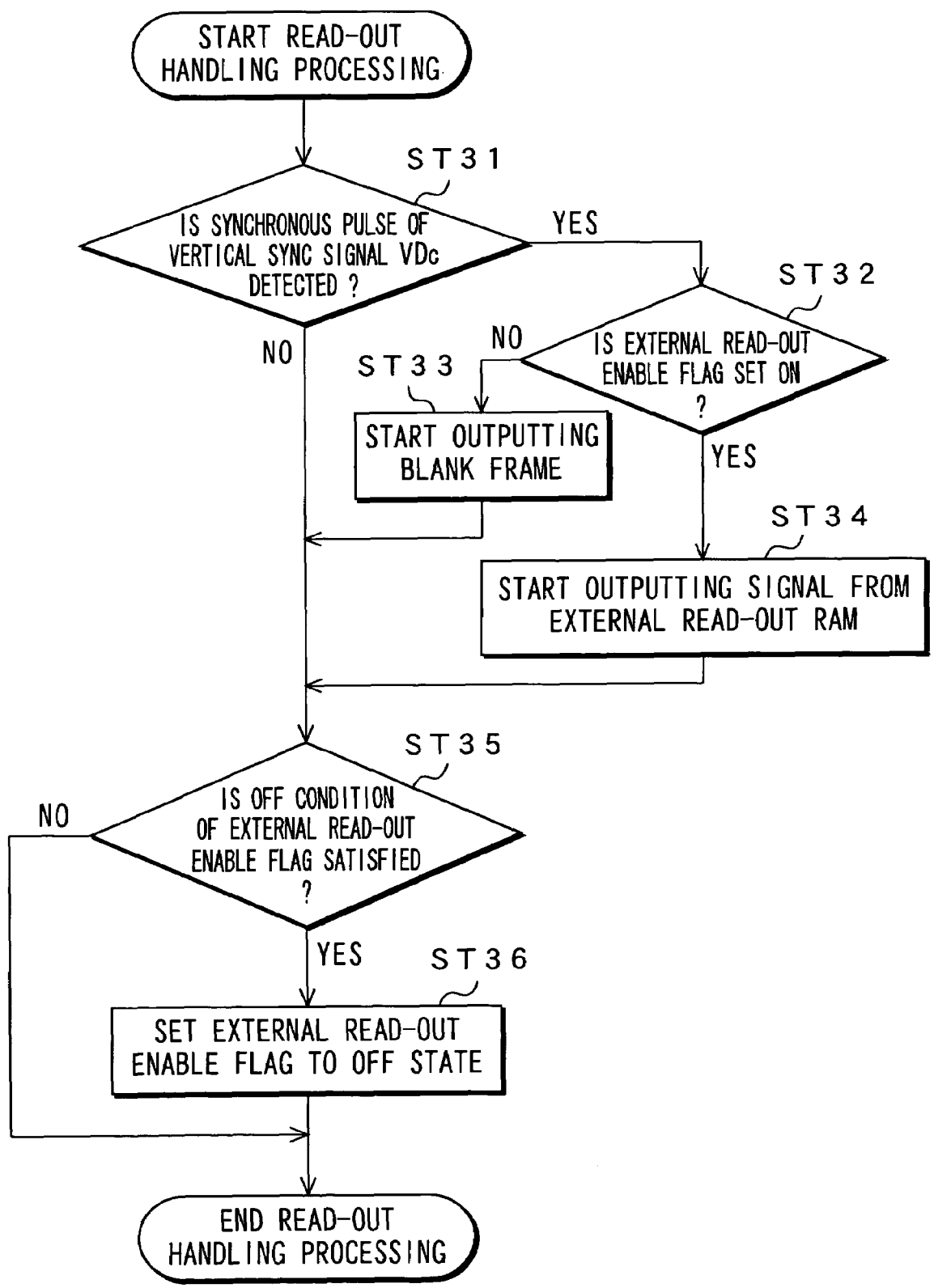
FIG. 16 is a flowchart for showing readout handling processing.

FIG. 16 is a flowchart for showing the read-out handling processing. At step ST31, it is determined whether or not a synchronous pulse is detected in the external read-out vertical sync signal DVc having the output frame rate FRc. If, in this case, the synchronous pulse of the vertical sync signal DVc is detected, the process goes to step ST32 and, otherwise, goes to step ST35.

At step ST32, it is determined whether or not the external read-out enable flag is set ON state. If, in this case, the external read-out enable flag is not set ON, the process goes to step ST35 through step 33 where a blank frame signal is output because there is no signal indicating that addition of frames as many as the number of additive frames FA is completed. If the external read-out enable flag is set to ON state, on the other hand, the process goes to step ST34 where starts the signal read-out from a later-described external read-out RAM in which a signal indicating that addition of frames as many as the number of additive frames FA is completed is written and then goes to step ST35.

At step ST35, it is determined whether or not an OFF condition of the external read-out enable flag is satisfied. If the read-out of a one-frame's signal from the external read-out RAM is completed, the process goes to step ST36. If the read-out of the one-frame's signal from the external read-out RAM has not yet completed or signal read-out is not performed or the external read-out enable flag is in the OFF state, the process ends the read-out handling processing. At step ST36, the external read-out enable flag is set to the OFF state. When the external read-out enable flag is set to the OFF state, the process releases the specification of the external read-out RAM, to end the read-out handling processing.

At step ST14, it is determined whether or not the write-in of the one-frame's signal to the write-in RAM is completed. If the write-in of the one-frame's signal has not yet completed at this step, the process returns to step ST13. If it is completed, the process goes to step ST15.

At step ST15, it is determined whether or not the addition of frames as many as the number of additive frames FA is completed. If addition of the frames as many as the number of additive frames FA has not yet completed, the process goes to step ST16 and, if the frame addition is completed, it goes to step ST20.

At step ST16, the process performs first RAM switching processing. In this first RAM switching processing, a write-in RAM is switched and any other unspecified RAM is specified as a write-in RAM. Further, the process specifies the RAM that has been specified as the write-in RAM before switching as an internal read-out RAM. Furthermore, the process releases the specification of an internal read-out RAM specified before switching.

At step ST17, the process adds together the input image signal DVc and the signal written in the internal read-out RAM to start write-in processing to the write-in RAM and then it goes to step ST18. At step ST18, the process performs the above-mentioned read-out handling processing and then it goes to step ST19.

At step ST19, it is determined whether or not the write-in of a one-frame's signal to the write-in RAM is completed. If the write-in of the one-frame's signal to the write-in RAM has not yet completed, the process returns to step ST18 and, if the write-in of the one-frame's signal is completed, it returns to step ST15.

AT step ST15, if it is determined that the addition of frames as many as the number of additive frames FA is completed and the process goes to step ST20, second RAM switching processing is performed therein. In the second RAM switching, the process switches a write-in RAM, to specify any other unspecified RAM as the write-in RAM. Further, the process specifies a write-in RAM that has been specified before switching, as an external read-out RAM. Furthermore, the process releases the specification of an internal read-out RAM specified before switching. Further, the external read-out enable flag is set to ON state because the addition of frames as many as the number of additive frames FA is completed and the process returns to step ST12.

Thus, when switching the write-in RAM and the internal read-out RAM while performing signal write-in and the addition of frames as many as the number of additive frames FA is completed, the process specifies the write-in RAM as an external read-out RAM and set the external read-out enable flag to ON state. Further, the process detects a state of the external read-out enable flag during write-in of the signal, to cause a signal indicating that the addition of the frames as many as the number of additive frames FA is completed to be output at the output frame rate FRc.

The following will specifically describe operations of the frame addition unit 41. FIGS. 17A-17G and 18A-18E are illustrations for explaining operations in a case where the output frame rate FRc is set to, for example, "24P" and the number of additive frames FA is "2". FIG. 17A shows the image signal DVb, FIG. 17B shows operations of the RAM 414-1, FIG. 17C shows operations of the RAM 414-2, FIG. 17D shows operations of the RAM 414-3, FIG. 17E shows the external read-out enable flag, and FIGS. 17F and 17G show the image signal DVj. Further, FIGS. 18A-18E show, by a bold line, a signal flow related to operations of the frame addition unit, with the control signal being omitted.

If the output frame rate FRc is set to "24P", the image shooting frame rate FRp is set to "48P" as described above, which is twice the output frame rate FRc.

Figure 18A:
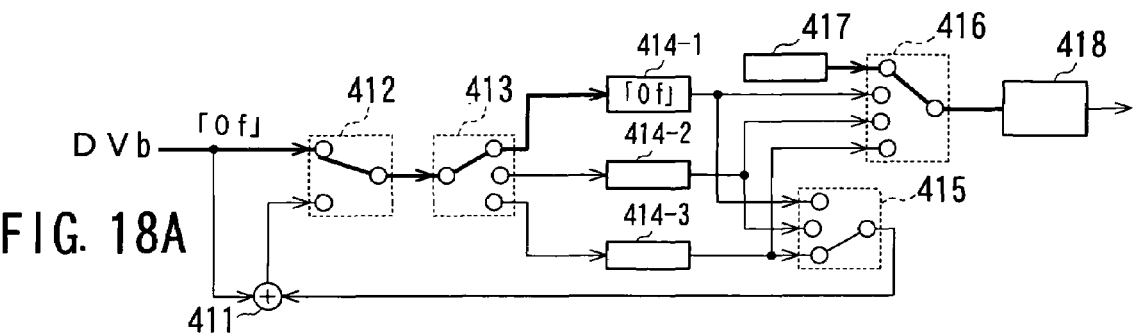
FIGS. 18A-18E are diagrams each showing a signal selector setting position in a case where the number of additive frames is "2"

At a moment t1 in FIGS. 17A-17G when a frame "0f" of the image signal DVb is input, the control unit 61 sets to the terminal Pa the variable terminal Pm of the signal selector 412 in the frame addition unit 41 as shown in FIG. 18A and sets to the terminal Pa the variable terminal Pm of the signal selector 413. In this case, the RAM 414-1 is specified as a write-in RAM and supplied with an image signal of the frame "0f". Further, the control unit 61 supplies the RAM 414-1 with the write-in control signal WTa, to cause the image signal of the frame "0f" to be stored in the RAM 414-1.

At a moment t2 when a frame starting timing for the image signal DVj is encountered, that is, when a synchronous pulse of the vertical sync signal DVc is detected, the control unit 61 sets the variable terminal Pm of the signal selector 416 to the terminal Pa connected to the blank frame setting circuit 417 since it is shown that the external read-out enable flag is in the OFF state and the addition of a two-frame's image signal has not yet completed. In this case, as shown in FIG. 18F, the image signal DVj becomes of a blank frame.

Figure 18B:
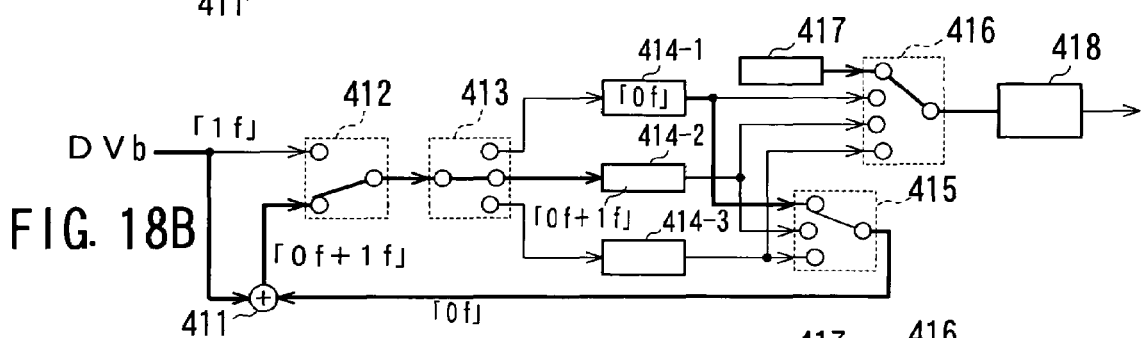

At a moment t3 when the frame "0f" ends and an image signal of a frame "1f" is input, the control unit 61 sets the variable terminal Pm of the signal selector 415 to the terminal Pa as shown in FIG. 18B, to specify the RAM 414-1 as the internal read-out RAM. This RAM 414-1 is supplied with the read-out control signal RTa, to read out the image signal of the frame "0f" stored in it. In this case, the adder 411 is supplied with the image signal DVb of the frame "1f" and also with, as the image signal DVf, the image signal "0f" read out of the RAM 414-1. Therefore, the adder 411 adds together the image signal of the frame "0f" and that of the frame "1f" to thus generate the sum signal DVg. Further, the control unit 61 sets the variable terminal Pm of the signal selector 412 to the terminal Pb. Furthermore, it sets the variable terminal Pb of the signal selector 413 to, for example, the terminal Pb to thereby specify the RAM 414-1 as the write-in RAM, thus supplying the sum signal DVg to the RAM 414-2. Furthermore, the control unit 61 supplies the RAM 414-2 with the write-in control signal WTa, to cause the sum signal DVg obtained by adding the image signals of the frames "0f" and "1f" together to be stored in the RAM 414-2.

Figure 18C:
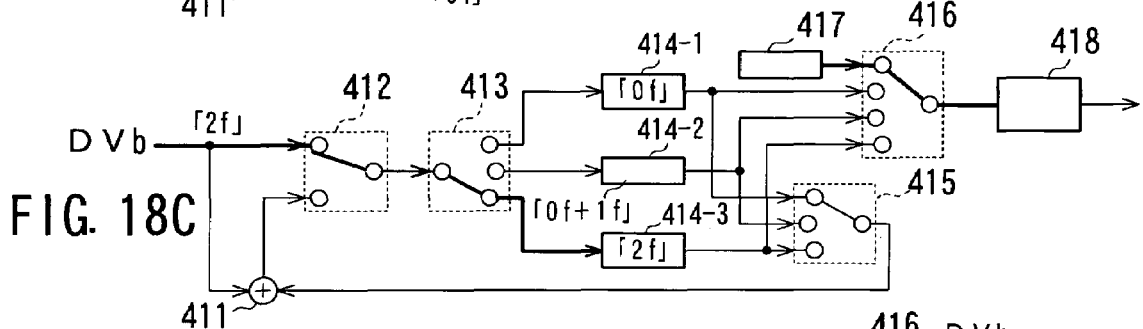

At a moment t4 when the frame "1f" ends and an image signal DVb of a frame "2f" is input, the control unit 61 sets the variable terminal Pm of the signal selector 412 to the terminal Pa as shown in FIG. 18C and sets the variable terminal Pm of the signal selector 413 to, for example, the terminal Pc. In this case, the RAM 413-3 is specified as the write-in RAM and supplied with the image signal DVb of the frame "2f". Further, the control unit 61 supplies the RAM 414-3 with the write-in control signal WTa, to cause the image signal of the frame "2f" to be stored in the RAM 414-3. Further, since the addition of two frames of the signals is completed at the moment t4, the external read-out enable flag is set to the ON state and the RAM 414-2 in which the sum signal is stored is also specified as the external read-out RAM, as shown in FIG. 17E.

Figure 18D:
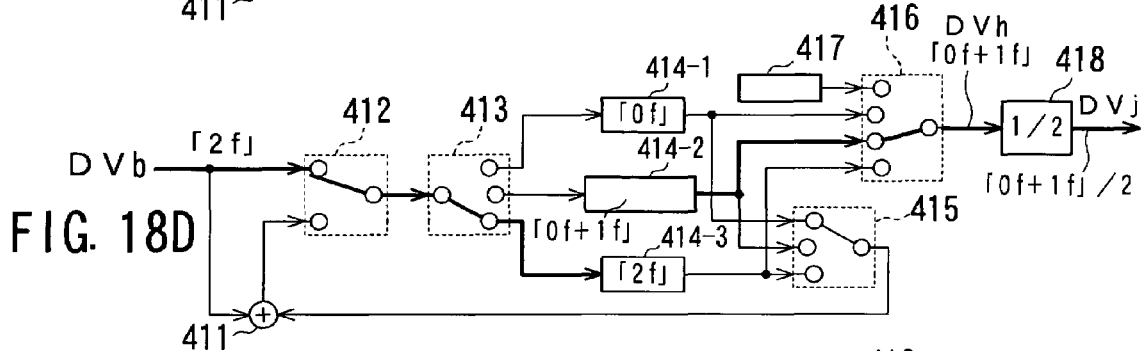

Next, if the read-out enable flag is set to the ON state after the external read-out RAM is specified when a frame starting timing for the image signal DVj is encountered, for example, at a moment t5, the control unit 61 sets the variable terminal Pm of the signal selector 416 to the terminal Pc connected with the RAM 414-2 specified as the external read-out RAM as shown in FIG. 18D. Further, the control unit 61 supplies the RAM 414-2 with the read-out control signal RTa to read out the stored sum signal and supply it as the image signal DVh to the level adjustment circuit 418. Furthermore, the control unit 61 supplies the control signal CTe to the level adjustment circuit 418, to allow a signal level of the image signal DVh to be multiplied by a factor of "1/the number of additive frames", that is, a factor of "½" because the number of additive frames is "2" and it to be output as the image signal DVj.

In this case, the output frame of the image signal DVj is supposed to be fixed to "60P" in accordance with an external device, for example, a video tape recorder, etc., connected to the image pick-up apparatus so that the image shooting speed can be changed without forcing the external device to change operations in particular.

Figure 18E:
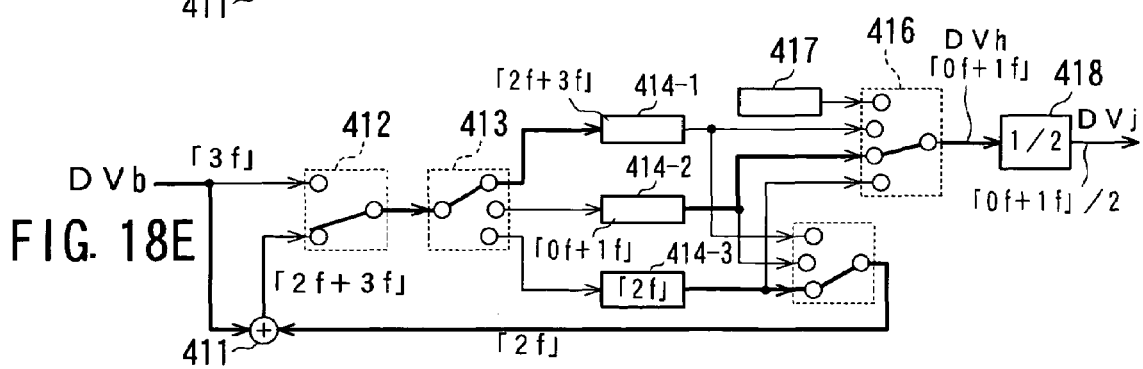

At a moment t6 when an image signal of a frame "3f" is input, the control unit 61 sets the variable terminal Pm of the signal selector 415 to the terminal Pc as shown in FIG. 18E. Further, it supplies the RAM 414-3 with the read-out control signal RTa, to read out the stored image signal of the frame "2f". In this case, the adder 411 is supplied with the image signal DVb of the frame "3f" and also with, as the image signal DVf, the image signal of the frame "2f" read out of the RAM 414-3. Therefore, the adder 411 adds together the images signals of the frames "2f" and "3f" to generate the sum signal DVg. Further, the control unit 61 sets the variable terminal Pm of the signal selector 412 to the terminal Pb and also sets the variable terminal Pm of the signal selector 413 to, for example, the terminal Pa, to supply the sum signal DVg to the RAM 414-1 specified as the write-in RAM. Further, the control unit 61 supplies the RAM 414-1 with the write-in control signal WTa, to cause the sum signal DVg obtained by adding the image signals of the frames "2f" and "3f" together to be stored in the RAM 414-1.

At a moment t7 when read-out of a one-frame's signal from the RAM 414-2 ends, the external read-out enable flag is set to the OFF state. Further, the specification of the external read-out RAM is released. Furthermore, the variable terminal Pm of the signal selector 416 is switched to the terminal Pa because the addition of the next two-frames of the frames "2f" and "3f" has not yet completed, thereby outputting a blank frame.

Similarly, the control unit 61 uses the RAMs 414-1 through 414-3, the adder 411, and the like to add together the image signal DVb of two frames so as to generate a sum signal and read it out at a frame start timing of the image signal DVj, thus adjusting a signal level of the sum signal in accordance with the number of read-out additive frames. It is thus possible to obtain the image signal DVj that corresponds to a desired output frame rate FRc. That is, as shown in FIG. 17F, it is possible to generate the image signal DVj having a frame rate of "60P" to match the external device and containing an image at a desired output frame rate of "24P".

Further, if the external device connected to the image pick-up apparatus can accommodate a variation in frame rate, the image signal DVj having a desired output frame rate of "24P" may be generated. In this case, since the timing for obtaining the sum signal to which the signals of two frames have been added has the desired output frame rate of "24P", by reading out the written sum signal upon ending of write-in of the sum signal to the RAM 414 (for example, at the moment t4) as shown in FIG. 17G, the image signal DVj having the desired output frame rate of "24P" can be generated easily.

Further, if the image signal DVb is supposed to be of the CDR system, the control unit 61 causes, for example, a signal in the effective screen period to be stored in the write-in RAM. Further, when generating the image signal DVj, the control unit 61 reads out a signal stored in the external read-out RAM at a frequency equal to that at the time of write-in and also adjusts a retrace line period to generate the image signal DVj having a desired output frame rate FRc. In this case, it is possible to keep an image size of the effective screen period constant even if the output frame rate is varied.

Figure 20A:
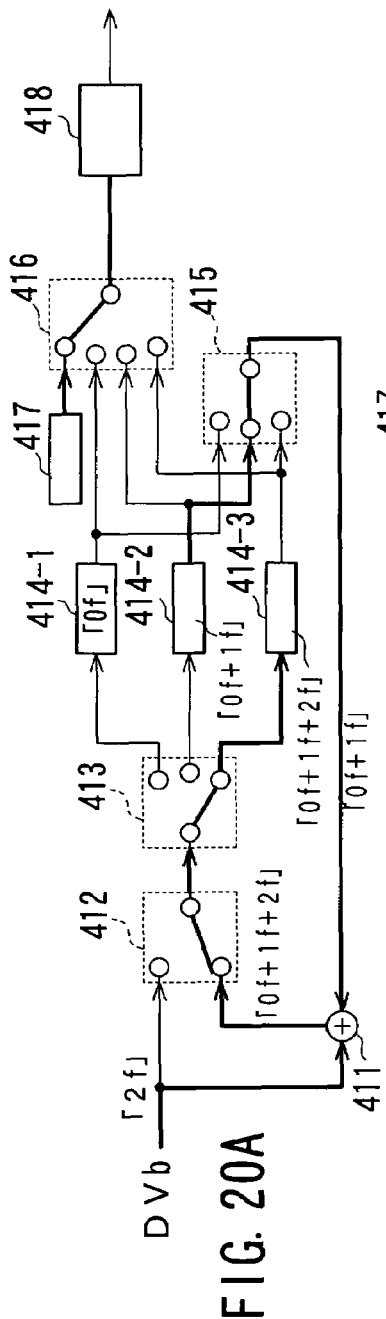
FIGS. 20A-20C are diagrams each showing signal selector setting position where the number of additive frames is "3"
Figure 20B:
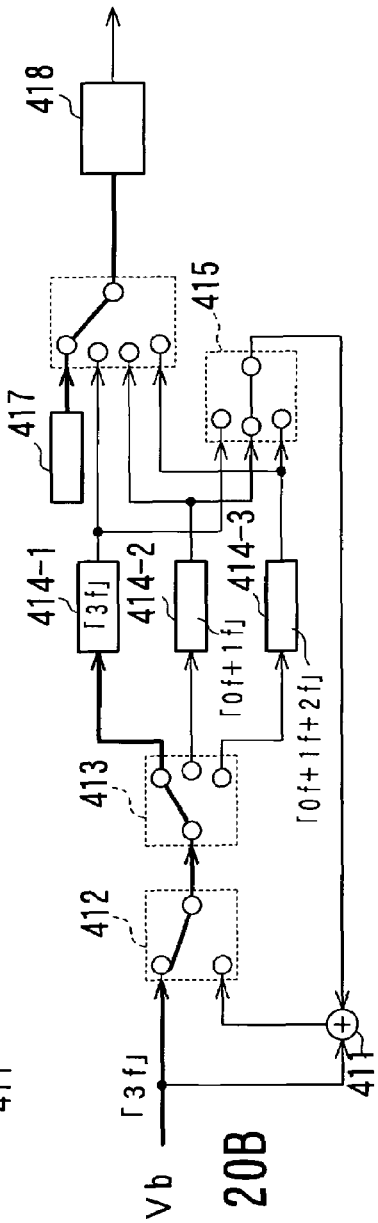
Figure 20C:
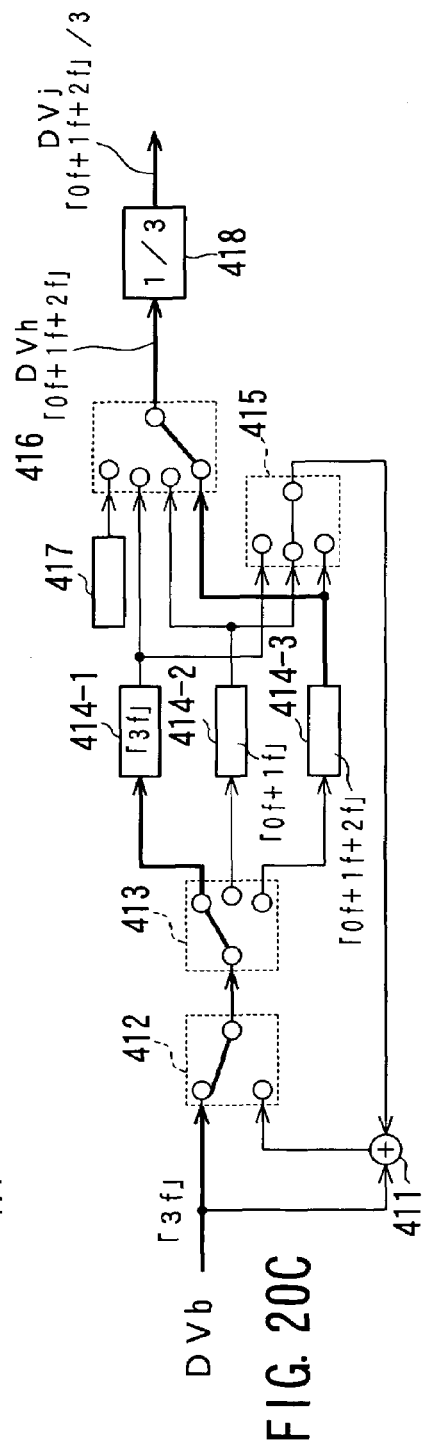

The following will describe a case where the image signals DVb of three frames are added together, with reference to FIGS. 19A-19G and 20A-20C. When, for example, the output frame rate is "16P", the number of additive frames is "3". In this case, the image shooting frame rate is "48P", which is three times the output frame rate, as described above. FIG. 19A shows the image signal DVb, FIG. 19B shows operations of the RAM 414-1, FIG. 19C shows operations of the RAM 414-2, FIG. 19D shows operations of RAM 414-3, FIG. 19E shows the external read-out enable flag, and FIGS. 19F and 19G show the image signal DVj. Further, FIGS. 20A-20C show a signal flow related to operations of the frame addition unit in a bold line, with the control signal being omitted.

At a moment t11 shown in FIGS. 19A-19F when the frame "0f" of the image signal DVb starts, the control unit 61 controls the signal selectors 412 and 413 and the RAM 414-1 as described above, to cause the image signal DVb of the frame "0f" to be stored in the RAM 414-1 specified as a write-in RAM.

At a moment t12 when a frame starting timing for output frames of the image signal DVj is encountered and a synchronous pulse of the vertical sync signal DVc is detected, the control unit 61 sets the variable terminal Pm of the signal selector 416 to the terminal Pa connected with the blank frame setting circuit 417 because the addition of the image signals of three frames has not yet completed. In this case, as shown in FIG. 19F, the image signal DVj becomes of a blank frame.

At a moment t13 when the frame "0f" of the image signal DVb ends and its frame "1f" starts, the control unit 61 specifies the RAM 414-1 as an internal read-out RAM. Further, it specifies, for example, the RAM 414-2 as a write-in RAM to cause the adder 411 to add together the signals of the frames "0f" and "1f" stored in the RAM 414-1, which is the internal read-out RAM. Further, it causes a resultant sum signal DVg to be stored in the RAM 414-2, which is the write-in RAM.

At a moment t14 when the frame "1f" of the image signal DVb ends and its frame "2f" starts, in order to generate a three-frame sum signal, the control unit 61 specifies the RAM 414-2 specified as the write-in RAM as an internal read-out RAM and sets the variable terminal Pm of the signal selector 415 to the terminal Pb connected with the internal read-out RAM as shown in FIG. 20A. Further, it supplies the read-out control signal RTa to the RAM 414-2, which is the internal read-out RAM, to cause the sum signal of the frames "0f" and "1f" stored in the RAM 414-2 to be read out. In this case, the adder 411 receives the image signal DVb of the frame "2f" and the sum signal read out of the RAM 414-2 as the image signal DVf. Therefore, the adder 411 generates the sum signal DVg obtained by adding the image signals of the frames "0f" through "2f". Further, the control unit 61 sets the variable terminal Pm of the signal selector 412 to the terminal Pb and also sets the variable terminal Pm of the signal selector 413 to the terminal Pc, to supply the sum signal DVg to the RAM 414-3, which is specified as the write-in RAM. Further, the control unit 61 supplies the write-in control signal WTa to the RAM 414-3, to cause the RAM 414-3 to store the sum signal DVg of the frames "0f" through "2f".

At a moment t15 when the frame "2f" of the image signal DVb ends and its frame "3f" starts, the control unit 61 specifies the RAM 414-3 specified as the write-in RAM as an external read-out RAM because generation of the sum signal given by adding together the image signals DVb of frames as many as the number of additive frames, that is, three frames is completed and sets the external read-out enable flag to the ON state. Further, as shown in FIG. 20B, it sets the variable terminal Pm of the signal selector 412 to the terminal Pa and also sets the variable terminal Pm of the signal selector 413 to the terminal Pa, to supply the image signal DVb of the frame "3f" to the RAM 414-1 specified as the write-in RAM. Further, the control unit 61 supplies the RAM 414-1 with the write-in control signal WTa, to cause the image signal of the frame "3f" to be stored in the RAM 414-1.

Next, at a moment t16, for example, when a frame starting timing for the image signal DVj is encountered in a condition where the external read-out enable flag is set to the ON state after writing the sum signal onto RAM 414 has completed, as shown in FIG. 20C, the control unit 61 sets the variable terminal Pm of the signal selector 416 to the terminal Pc connected with the RAM 414-3, which is the external read-out RAM. Further, the control unit 61 supplies the RAM 414-3 with the read-out control signal RTa, to read out the stored sum signal obtained by adding the image signals of three frames together and supply it as the image signal DVh to the level adjustment circuit 418. Further, the control unit 61 supplies the control signal CTe to the level adjustment circuit 418, to cause a signal level of the image signal DVh to be multiplied by a factor of "⅓" and cause it to be output as the image signal DVj.

In this case, the output frame of the image signal DVj is fixed to "60P" to match the external device connected to the image pick-up apparatus as described above. Note that when a frame starting timing of an output frame of the image signal DVj is encountered if write-in, to the RAM, of the sum signal obtained by adding together image signals of frames as many as the number of additive frames has not yet completed or if read-out of the sum signal completely written into it is completed, this output frame is defined to be a blank frame.

At a moment t17 when read-out of a one-frame's signal from the RAM 414-3 ends, the external read-out enable flag is set to the OFF state and also the specification of the external read-out RAM is released. Further, since the addition of signals of the next three-frames of "3f" through "5f" has not yet completed, the variable terminal Pm of the signal selector 416 is switched to the terminal Pa, thereby outputting the blank frame.

Similarly, the control unit 61 uses the RAM 414-1 through 414-3, the adder 411, and the like to add together the image signals DVb of three frames so as to generate a sum signal and read it out at a frame staring timing of the image signal DVj, thereby generating the image signal DVj in accordance with a desired output frame rate FRc. That is, as shown in FIG. 19F, it is possible to generate the image signal DVj having a frame rate of "60P" to match the external device and containing an image at a desired output frame rate of "16P".

Further, if the external device connected to the image pick-up apparatus can accommodate a variation in frame rate, the image signal DVj having a desired frame rate of "16P" may be generated. In this case, since the timing for obtaining the sum signal of the signals of three frames has the desired output frame rate of "16P", by reading out the written sum signal upon ending of write-in of the sum signal obtained by adding together the signals having the frames as many as the number of additive frames to the RAM 414 as shown in FIG. 19G, the image signal DVj having the desired output frame rate of "16P" can be generated easily.

Further, as in the case of adding the signals of two frames together, by storing a signal in the effective screen period into the write-in RAM and also reading out a signal stored in the external read-out RAM at a frequency equal to that at the time of write-in so as to adjusts a retrace line period, it is possible to keep an image size of the effective screen period constant even if the output frame rate is varied.

Further, since the frame addition unit 41 multiplies a signal level of the image signal DVh by a factor of "1/the number of additive frames" at the level adjustment circuit 418 to thereby generate the image signal DVj, it is possible to generate the image signal DVj subject to less reduction in picture quality. Further, the frame addition unit 41 may adjust the signal level of the image signal DVb in accordance with the number of additive frames beforehand to then perform the frame addition processing. In this case, since a signal used in the addition processing or stored in the RAM has a smaller bit width, a configuration of the frame addition unit 41 can be made simpler than that in the case where the signal level of the image signal DVh is adjusted at the level adjustment circuit 418.

By the way, the output frame rate FRc may be varied during image shooting in order to obtain special image shooting effects. Operations in the case of varying the output frame rate during the image shooting will be described.

When the output frame rate varies, there may be either a case where the addition processing of image signal is performed as described above or a case where it is not performed. For example, when, as shown in FIG. 9, the output frame rate FRc is set in a range of "60P≧FRc≧30P", frame addition processing is unnecessary, while when the output frame rate FRc is "30P" or less, the frame addition processing is performed. Therefore, the control unit 61 performs various processes based on a case where the frame addition processing is performed or not.

FIGS. 21A-21G show a case where frame addition processing is not performed, for example, the case of changing the output frame rate from 60P to 48P. In this case, the control unit 61 switches the image shooting frame rate FRp after a frame of the image signal DVb ends. Further, it uses the RAMs 414-1 through 414-3 sequentially, to cause a one-frame's image signal to be stored in each of the RAMs, thereby reading the stored image signal out at the output frame rate FRc when a frame starting timing for the image signal DVj is encountered if the stored signal has not yet read out and outputting it.

If the output frame rate is changed from "48P" to "60P" at a moment t31 by the frame rate setting signal RST sent from the operation unit 62 shown, for example, in FIG. 21A, the control unit 61 controls the image shooting unit 21 through the drive unit 71, to switch the image shooting frame rate FRp at a moment t32 when a frame of the image signal DVb shown in FIG. 21B ends. Note that FIGS. 21C, 21D, and 21E show operations of the RAMs 414-1, 414-2, and 414-3 respectively; the control unit 61 allows the RAMs 414-1 through 414-3 to store each frame of the image signal DVb shown in FIG. 21B sequentially as shown in FIGS. 21C, 21D, and 21E. Further, at a moment t41, for example, when a frame starting timing for the image signal DVj is encountered, a signal stored in the RAM 414-1 is read out. At a moment t42 when the frame starting timing for the image signal DVj is encountered, a signal stored in the RAM 414-2 is read out. At a moment t43 when the frame starting timing for the image signal DVj is encountered, a signal stored in the RAM 414-3 is read out. Further, as indicated at a moment t44 when read-out of the image signals stored in the RAMs 414-1 through 414-3 is already terminated, the relevant frame is defined to be a blank frame.

By performing such the processing, even if an output frame rate FRc is changed during image shooting, such a image signal DVj can be generated that has a frame rate of "60P" matching the external device and that contains an image at the output frame rate thus changed, as shown in FIG. 21F. Further, if the external device connected to the image pick-up apparatus can accommodate a variation in frame rate, by performing the processing as in the above-mentioned case of FIG. 17G or 19G, the image signal DVj having a changed output frame rate FRc can be generated as shown in FIG. 21G.

FIGS. 22A-22G show a case of changing the output frame rate FRc from 31P to, for example, 30P, 29P, and 28P in the frame addition processing. In this case, the control unit 61 obtains a sum signal given by adding together the image signals having the frames as many as the number of additive frames and then changes the image shooting frame rate FRp and the number of additive frames FA.

For example, if the output frame rate FRc is changed from "31P" to "30P" at a moment t51 by the frame rate setting signal RSF sent from the operation unit 62 shown in FIG. 22A, the control unit 61 controls the image shooting unit 21 through the drive unit 71, to switch the image shooting frame rate FRp at a moment when a frame of the image signal DVb ends as shown in FIG. 22B. Note that FIGS. 22C, 22D, and 22E show operations of the RAMs 414-1, 414-2, and 414-3 respectively.

In this case, as shown in FIG. 9, when the output frame rate FRc is "31P", the image shooting frame rate FRp is "31P"; when the output frame rate FRc is "30P", the image shooting frame rate FRp is "60P". Therefore, the control unit 61 switches the image shooting frame rate FRp from "31P" to "60P" at a moment t52. Further, the control unit 61 causes the RAM 414-1, for example, to store the image signal DVb of the frame "1f" when the image shooting frame rate FRp is "31P", as shown in FIG. 22C. Further, since the output frame rate FRc is thus changed from "31P" to "30P", correspondingly the number of additive frames FA is changed from "1" to "2". Therefore, the control unit 61 controls operations of the frame addition unit 41 to add together the image signals DVb of two frames so as to generate a sum signal as described above, thus outputting this sum signal as the image signal DVj in processing.

When the output frame rate FRc is changed from "30P" to "29P" at a moment t53, a frame of a resultant image signal DVb ends at a moment t54. However, at the moment t54, processing of adding the image signals of two frames together has not yet completed. Therefore, the control unit 61 switches the image shooting frame rate FRp from "60P" to "58P" at the time when the next frame ends, that is, at a moment t55 when addition of the image signals of the two frames is completed. Thus, the image shooting frame rate FRp is varied after the frame addition processing has been completed, thereby allowing the image signal DVj to be a proper image signal in accordance with an output frame rate varied by the operation unit 62 as shown in FIG. 22F. Further, FIG. 22G shows a case where, if the external device connected to the image pick-up apparatus can accommodate a variation in frame rate, the image signal DVj having a varied output frame rate is generated.

Switching the image shooting frame rate after processing of adding together the image signals having the frames as many as the number of additive frames has been completed allows a proper image signal to be output at a desired output frame rate.

Further, although the embodiment has been described with a case where the image signal DVb is of the progressive scanning method, the image signal DVb may be of the interlace scanning method. FIG. 23A shows the vertical sync signal VDb with respect to an image signal DVb of the progressive scanning method shown in FIG. 23B. By adding together an image signal DVb shown in FIG. 23B and a signal read out of the internal read-out RAM shown in FIG. 23C using a synchronous pulse of the vertical sync signal VDb as a reference, signals at the same line position can be added together.

If the image signal is of the interlace scanning method, a vertical sync signal VDb-i appears as shown in FIG. 23D and an image signal DVb-i appears as shown in FIG. 23E. By adding together an image signal DVb shown in FIG. 23E and a signal read out of the internal read-out RAM shown in FIG. 23F using a synchronous pulse of the vertical sync signal VDb-i as a reference, signals at different line positions are added together, thus deteriorating a vertical resolution. Therefore, if a signal of the interlace scanning method is used, as shown in FIG. 23G, parenthesized synchronous pulses of the vertical sync signal VDb-i are invalidated to use synchronous pulses of the vertical sync signal VDb-i in frame-units, so that using this frame-unit synchronous pulse as a reference, the image signal VDb shown in FIG. 23H and a signal read out from the internal read-out RAM shown in FIG. 23J are added together. By performing such addition processing, signals at the same line position, even if they are of the interlace scanning method, can be added together as in the case where they are of the progressive scanning method.

By the way, an image pick-up apparatus not only shoots an image simply but also shoots an image using a shutter function even at a low speed. If the electronic shutter operations are to be performed by adjusting a charge storage period employed at the image shooting unit 21 when a plurality of frames of image signals are added together as described above and the charge storage period of a CCD is controlled for each frame in accordance with a shutter speed conventionally, a picked up image may encounter a pseudo-profile in some cases as described later. Therefore, when performing the electronic shutter operations, the charge storage period of the CCD is controlled on the basis of settings of a shutter-open period and the number of additive frames. Further, the frame addition unit 41 performs the frame addition processing in accordance with control on the charge storage period at the CCD.

In control of the CCD charge storage period, the shutter-open period is set continuously on the periods provided as many as the number of additive frames. For example, if the output frame rate is set to "20P", the number of additive frames is "3" and the image shooting frame rate FRp is "60P" as can be seen from FIG. 9. If the shutter-open period is set to a desired ratio of, for example, 50% as shown in FIG. 24A with respect to the output frame rate when a subject OBb moves from a position PJ11 to a position PJ17 in one frame period of the output frame rate from a moment t61 to a moment t67 as shown in FIG. 25A, in a shutter-open period the subject OBb moves from the position P11 to a position PJ14 as shown in FIG. 25B, thus providing such an image signal SLe on a PL line as shown in FIG. 25C.

If a shutter-open period is set in the image shooting unit 21 for each image shooting frame and a ratio of the shutter-open period is set to the desired value of 50% as described above when the image shooting frame rate FRp is "60P" as shown in FIG. 24B, during a shutter-open period from the moment t61 to a moment t62 the subject OBb moves from the position P11 to a position PJ12 as shown FIG. 25D, thus providing such an image signal SLf on the PL line as shown in FIG. 25E. Further, during a shutter-open period from a moment t63 to a moment t64, as shown in FIG. 25F, the subject OBb moves from a position PJ13 to the position PJ14, thus providing such an image signal SLg as shown in FIG. 25G. During a shutter-open period from a moment t65 to a moment t66, as shown in FIG. 25H, the subject OBb moves from a position PJ15 to a position PJ16, thus providing such an image signal as shown in FIG. 25J. Therefore, an image signal SLj obtained by adding the image signals of three frames together appears as shown in FIG. 25K, thus resulting in the one having a pseudo-profile. To solve this problem, as shown in FIGS. 24C-24E, a ratio of a continuous shutter-open period with respect to a period of the number of additive frames is set to 50%.

This shutter-open period may be set at some point in a period of frames to be added together if continuous (hereinafter referred to as "frame-addition period"). For example, when frames "FC-1" through "FC-3" are to be added as shown in FIG. 24C, a period from a start of the frame "FC-1" to an end of the frame "FC-3" constitutes a frame-addition period, so that the shutter-open period-is set from the beginning of this frame-addition period. Alternatively, as shown in FIG. 24D, the shutter-open period may be set at the ending of the frame-addition period. Further alternatively, as shown in FIG. 24E, the shutter-open period may be set at a middle of the frame-addition period.

In the case of FIG. 24C, the CCD opens its shutter in a period of the frame "FC-1". By this shutter-opening operation, charge is stored, thereby generating an image signal based on the charge thus stored and then outputting it. Further, within a period of the frame "FC-2" and in a period from a moment t71, which is a start of the frame "FC-2", to a moment t72, the shutter is opened. Then, a period from the moment t72 to a moment t73, which is an end of the frame "FC-2", is supposed to constitute a shutter-closing operation, and during this period no image signal is generated. Since charge stored during a period of the frame "FC-3" is not used to generate an image signal, the shutter is closed during a period of the frame "FC-3". Further, the frame addition unit 41 adds together the image signals that have been generated in a period from the frame "FC-1" through the frame "FC-3". This allows a shot image free of a pseudo-profile to be obtained.

Further, in the case of FIG. 24D, opposite to the operations of the CCD of FIG. 24C, it closes the shutter and then opens it, thus making it possible to obtain a shot image free of a pseudo-profile. Furthermore, as shown in FIG. 24E, it can also open the shutter halfway through the period of the frame "FC-1" and end opening the shutter at an end point of the shutter-open period, thus obtaining a shot image free of a pseudo-profile.

Further, by setting a continuous shutter-open period such as shown in FIGS. 24C-24E using a mechanical shutter or an optical shutter, a shot image free of a pseudo-profile can be obtained as in the case of an electronic shutter.

The following will describe operations of the frame rate conversion unit 51. When an output frame rate is changed in the low-speed image shooting as described above, an update interval of the image is prolonged if a shot image is displayed using an image signal having the output frame rate on an image display apparatus, for example, an electronic viewfinder. Therefore, the frame rate conversion unit 51 generates an image signal having a monitor frame rate based on the image signal DVb.

Figure 26:
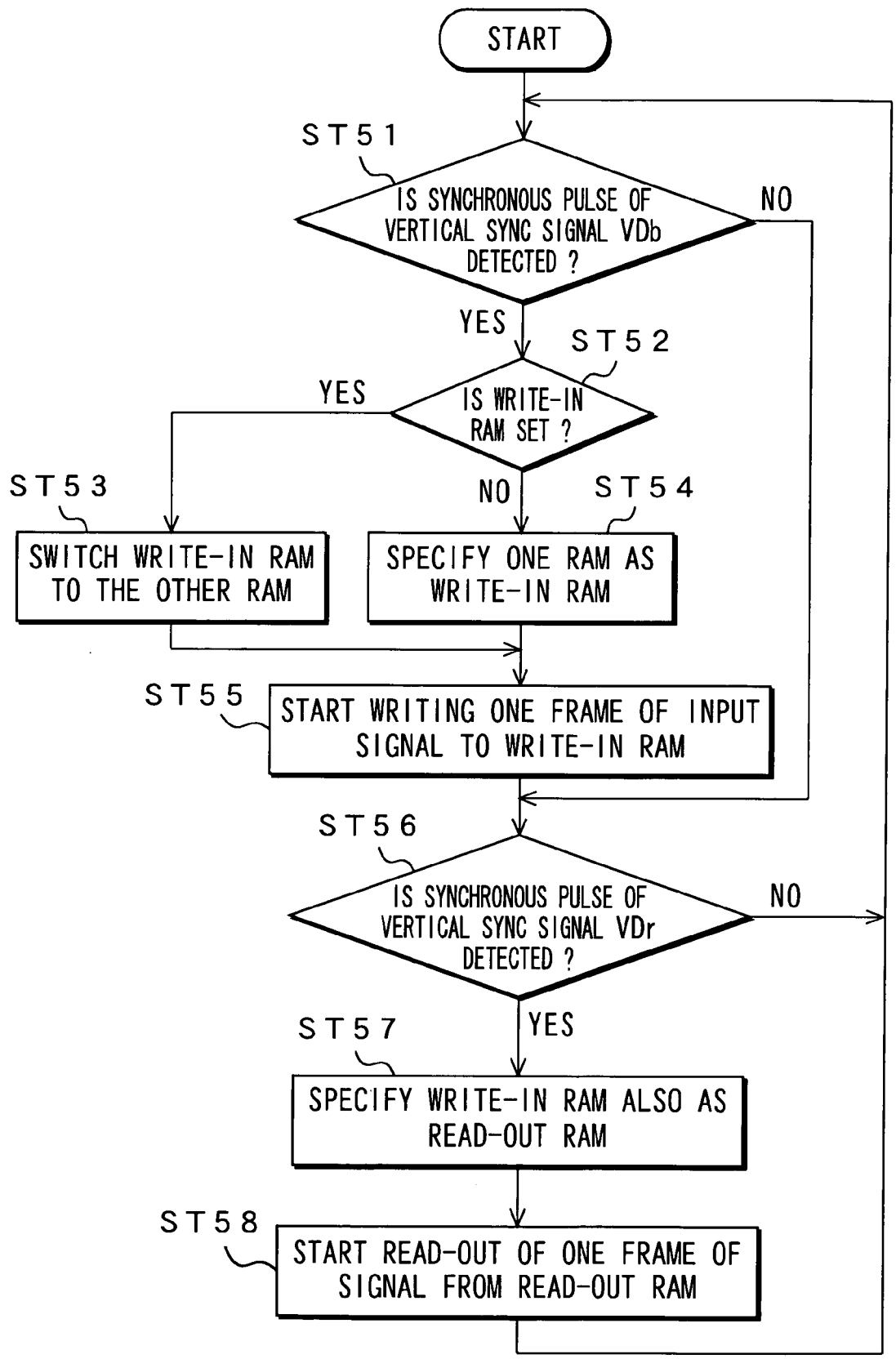
FIG. 26 is a flowchart for showing frame rate conversion operation.

FIG. 26 is a flowchart for showing frame rate conversion by the frame rate conversion unit 51 shown in FIG. 5. At step ST51, it is determined whether a synchronous pulse is detected in the vertical sync signal VDb of the image signal DVb. If any synchronous pulse of the vertical sync signal VDb is detected, the process goes to step ST52. If it is not detected, on the other hand, the process goes to step ST56.

At step ST52, if the write-in RAM, that is, a RAM to store the image signal DVb is specified to either the RAM 512a or the RAM 512b, the process goes to step ST53 and, otherwise, goes to step ST54.

At step ST53, the other RAM not yet specified is specified as the write-in RAM and the process goes to step ST55. At step ST54, either the RAM 512a or the RAM 512b is specified as the write-in RAM and the process goes to step ST55. At step ST55, writing the image signal DVb of one frame into the specified write-in RAM starts and the process goes to step ST56.

At step ST56, it is determined whether a synchronous pulse of the vertical sync signal VDr corresponding to an image signal to be supplied to the image display apparatus is detected. If no synchronous pulse of the vertical sync signal VDr is detected, the process returns to step ST51. If it is detected, on the other hand, the process goes to step ST57.

At step ST57, the RAM specified as the write-in RAM is also specified as a read-out RAM and the process goes to step ST58. At step ST58, reading out a one-frame's signal from the read-out RAM starts and the process returns to step ST51.

FIGS. 27A-27F are illustrations for explaining frame rate conversion by the frame rate conversion unit 51. FIG. 27A shows a vertical sync signal VDb of the image signal DVb shown in FIG. 27B. FIG. 27C shows operations of the RAM 512a and FIG. 27D, operations of the RAM 512b.

If the write-in RAM is first not specified, any one of the RAMs, for example, the RAM 512a, is specified as the write-in RAM and this causes the RAM 512a to store a signal of the frame "0f" of the image signal DVb. If a one-frame's signal is stored and a synchronous pulse of the vertical sync signal VDb is detected at a moment t82, the write-in RAM is switched to the RAM 512b, thus allowing a signal of the frame "1f" of the image signal DVb to be stored in the RAM 512b. Further, if a synchronous pulse of the vertical sync signal DVb is detected at a moment t83, the write-in RAM is switched to the RAM 512a, thus allowing a signal of the frame "2f" of the image signal DVb to be stored in the RAM 512a. Similarly, the image signal DVb is alternatively stored in either the RAM 512a or the RAM 512b in units of one frame.

FIG. 27F shows the vertical sync signal VDr having the monitor frame rate. If a synchronous pulse of the vertical sync signal VDr is detected at a moment t81, the RAM 512a specified as the write-in RAM is specified as the read-out RAM, thus reading a signal of the frame "0f" out of the RAM 512a to generate the image signal DVr shown in FIG. 27E. Further, if a synchronous pulse of the vertical sync signal VDr is detected at a moment t84, the RAM 512a specified as the write-in RAM is specified as the read-out RAM, thus reading a signal of the frame "2f" out of the RAM 512a to provide this signal as the image signal DVr. By performing the processing similarly, the image signal DVr having the monitor frame rate can be generated.

If, in this case, a RAM, for example, a dual-port RAM, that is capable of simultaneous write-in and read-out, is used as the RAMs 512a and 512b, it is possible to output the image signal DVr with the image signal DVr being written. Further, if RAM that is not capable of simultaneous write-in and read-out is used as the RAMs 512a and 512b, that is, if the frame rate conversion unit is constituted as shown in FIG. 6, it is possible to generate the image signal DVr having the monitor frame rate by performing operations explained with reference to FIGS. 28A-28D.

FIG. 28A shows a reference signal PCLK indicative of one pixel and having a sampling frequency. FIG. 29B shows the image signal DVb. FIG. 29C shows an image signal DVp output from the register 514. Note that since the RAMs 516a and 516b each have an input bit width twice that of the image signal DVb, by writing the image signals DVb and DVp as one signal as shown in FIG. 28D, a signal having a period of two pixels can be written in a period of one pixel. For example, signals of pixels P1 and P2 of the image signal DVb can be written as a one-pixel signal DWa (1, 2). Therefore, a two-pixel-unit signal thus written is read out as signals DWb (n, n+1), . . . , at a frame starting timing that corresponds to the monitor frame rate using a spare time of write-in. By performing such the processing, it is possible to perform write-in and read-out operations almost simultaneously even using a RAM not capable of simultaneous write-in and read-out, thus generating the image signal DVr.

INDUSTRIAL APPLICABILITY

As described above, according to the image pick-up apparatus and the image pick-up method related to the present invention, an image signal having an image shooting frame rate is generated, and a frame addition is performed using the image signal having the image shooting frame rate. When it is impossible to obtain an image signal having output frame rate based on a signal for setting frame rate even if a image shooting frame rate is changed within a predetermined range, varying the number of additive frame in the frame addition allows the image signal having the output frame rate based on the signal for setting frame rate to be obtained from an image signal having the image shooting frame rate. Further, when shooting an image as a shutter function thereof, a shutter-opening period is continuously set in accordance with a period of additive frames to generate an image signal having the image shooting frame rate, thus obtaining a shot image free of a pseudo-profile. This allows a low-speed shooting without reducing the image shooting frame rate. Therefore, it is not necessary to decrease a quantity of light incident to the image pick-up device at a low-speed shooting, thus obtaining well qualified shot image. Thus, it is preferably suitable to shoot an image at variable frame rate. It is also suitable for a case where shooting an image using a shutter function thereof at a variable frame rate shooting.

The invention claimed is:

1. An image pick-up apparatus comprising:
   image shooting means for shooting a subject to generate an image signal having an image shooting frame rate;
   image adding means for performing frame addition on the image signal having the image shooting frame rate to generate an image signal having an output frame rate,
   wherein frame addition is performed by adding plural images over several frames to generate one image; and
   control means for controlling a variation of the image shooting frame rate in the image shooting means,
   wherein the variation of the image shooting means is determined as a function of an output frame set state and a determination of a number of additive frames, and
   wherein the determination of the number of additive frames is a function of a switching point of the number of additive frames and addition switching information, and
   wherein the output frame set state corresponds to the output frame rate.

2. The image pick-up apparatus according to claim 1 wherein said image shooting means generates the image signal having the image shooting frame rate using a Common Data Rate (CDR) system.

3. The image pick-up apparatus according to claim 1, wherein said image shooting means controls a retrace line period to be added to the image signal generated by shooting said subject, thereby making the image shooting frame rate thereof variable.

4. The image pick-up apparatus according to claim 3, wherein said image shooting means comprises an image pick-up device, said image pick-up device including:
   plural photoelectric transfer elements arrayed in a matrix;
   vertical transfer parts for vertically transferring charge read out of said plural photoelectric transfer elements; and
   a horizontal transfer part for horizontally transferring charge from the vertical transfer parts, and
   wherein said control means controls transfer operations of said vertical transfer parts and said horizontal transfer part to allow the retrace line period to be controlled.

5. The image pick-up apparatus according to claim 1, wherein said control means controls said image shooting frame rate to be set as being not less than the output frame rate.

6. The image pick-up apparatus according to claim 1, wherein said control means switched number of additive frames in accordance with the output frame rate, thereby limiting a range of variation of said image shooting frame rate to a predetermined range.

7. The image pick-up apparatus according to claim 1, wherein said control means includes storage means for storing addition switching information for limiting a range of variation of the image shooting frame rate to a predetermined range; and wherein said control means controls said image shooting means and said addition processing means based on said addition switching information.

8. The image pick-up apparatus according to claim 1 further comprising output signal processing means for executing processing on an image signal output from said addition processing means.

9. An image pick-up apparatus according to claim 1, wherein said control means continuously sets the shutter-open period on the periods provided as many as the number of additive frames to be added by said addition processing means at the time of performing a shutter operation, thereby allowing said image shooting means to generate an image signal in a shutter-open period.

10. The image pick-up apparatus according to claim 1 further comprising operating means for allowing said output frame rate set state to be determined.

11. An image pick-up method comprising the steps of:
shooting a subject to generate an image signal having an image shooting frame rate;
performing frame addition, on the image signal having the image shooting frame rate to generate an image signal having an output frame rate,
wherein frame addition is performed by adding plural images over several frames to generate one image;
controlling a variation of the image shooting frame rate in the image shooting means;
determining the variation of the image shooting frame as a function of an output frame set state and a determination of a number of additive frames;
determining of the number of additive frames as a function of a switching point of the number of additive frames and addition switching information; and
wherein the output frame set state corresponds to the output frame rate.

12. The image pick-up method according to claim 11, wherein said image signal having said image shooting frame rate is the image signal of a Common Data Rate (CDR) system.

13. The image pick-up method according to claim 11, wherein controlling a retrace line period to be added to the image signal generated by shooting said subject allows the image shooting frame rate to be made variable.

14. The image pick-up method according to claim 13, wherein an image pick-up device generates the image signal having said image shooting frame rate; and the method further comprising:
vertically transferring charge read out of plural photoelectric transfer elements;
transferring charge from vertical transfer parts; and
controlling transfer operations of said vertical transfer parts and said horizontal transfer part allows the retrace line period to be controlled.

15. The image pick-up method according to claim 11, wherein said image shooting frame rate is set as being not less than the output frame rate.

16. The image pick-up method according to claim 11, further comprising:
switching number of additive frames in accordance with the output frame rate to limit a range of variation of said image shooting frame rate to a predetermined range.

17. An image pick-up method according to claim 11, further comprising:
controlling a variation of the image shooting frame rate and/or a switch of number of additive frames in the frame addition on the basis of addition switching information for limiting a range of variation of said image shooting frame rate to a predetermined range.

18. The image pick-up method according to claim 11 further comprising a step of executing processing on an image signal having said output frame rate.

19. The image pick-up method according to claim 11, further comprising:
continuously setting the shutter-open period on the periods provided to be the same as the number of additive frames; and
generating an image signal in a shutter-open period.

* * * * *